(12) United States Patent
Cajias et al.

(10) Patent No.: US 11,410,560 B2
(45) Date of Patent: Aug. 9, 2022

(54) METHOD AND APPARATUS FOR REPRESENTING AN AERIAL ROUTE IN A THREE-DIMENSIONAL SPACE

(71) Applicant: HERE Global B.V., Eindhoven (NL)

(72) Inventors: Raul Cajias, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 225 days.

(21) Appl. No.: 16/709,477

(22) Filed: Dec. 10, 2019

(65) Prior Publication Data

US 2021/0174688 A1 Jun. 10, 2021

(51) Int. Cl.
*G08G 5/00* (2006.01)
*G05D 1/10* (2006.01)

(52) U.S. Cl.
CPC .......... *G08G 5/0034* (2013.01); *G05D 1/101* (2013.01); *G08G 5/0069* (2013.01)

(58) Field of Classification Search
CPC .. G08G 5/0034; G08G 5/0069; G08G 5/0013; G08G 5/0026; G05D 1/101
See application file for complete search history.

(56) References Cited

U.S. PATENT DOCUMENTS

| 8,788,202 | B2 | 7/2014 | Schilling et al. |
| 9,818,304 | B2 | 11/2017 | Modica et al. |
| 9,933,269 | B2 | 4/2018 | Maischberger et al. |
| 2019/0051198 | A1 | 2/2019 | Nimmagadda et al. |
| 2020/0380876 | A1* | 12/2020 | Sachdeva ............. G08G 5/0069 |

OTHER PUBLICATIONS

Zompas, "Development of a Three Dimensional Path Planner for Aerial Robotic Workers", MSc Report, 2016, retrieved from https://pdfs.semanticscholar.org/900e/87b9c9228f755d8d37f9ee8f68532d0a0ffe.pdf, 39 pages.
Majeed et al.,, "A Fast-Global Flight Path Planning Algorithm Based on Space Circumscription and Sparse Visibility Graph for Unmanned Aerial Vehicle", Article, Dec. 2, 2018, pp. 1-27.
Fridovich-Keil, AtomMap: A Probabilistic Amorphous 3D Map Representation for Robotics and Surface Reconstruction, Published in: 2017 IEEE International Conference on Robotics and Automation (ICRA), May 2017, 8 pages.

* cited by examiner

*Primary Examiner* — Alan D Hutchinson
(74) *Attorney, Agent, or Firm* — Ditthavong, Steiner & Mlotkowski

(57) ABSTRACT

An approach is provided for representing an aerial route in a three-dimensional (3D) space. The approach, for example, involves determining a root 3D shape encompassing an aerial route through a 3D space. The 3D space is partitioned into a hierarchy of 3D shapes, and the aerial route comprises a list of 3D shape identifiers (IDs) corresponding to the 3D shapes that form the aerial route. The approach also involves recursively comparing a respective 3D shape ID of the root 3D shape or child shapes of the root 3D shape to the list of 3D shape IDs of the aerial route. The approach further involves generating a traversal command list by selectively adding the respective 3D shape ID that matches a 3D shape ID of the aerial route or includes the 3D shape ID as a child 3D shape ID. The approach further involves providing the traversal command list as an output.

20 Claims, 19 Drawing Sheets

FIG. 6

OUTPUT 601

<cube 1, collision probability 1>, <cube 2, collision probability 2>,..., <cube n, collision probability n>

METHOD AND APPARATUS FOR REPRESENTING AN AERIAL ROUTE IN A THREE-DIMENSIONAL SPACE

BACKGROUND

Routing an aerial vehicle or drone (e.g., unmanned aerial vehicle (UAV)) in a three-dimensional (3D) space or environment presents unique challenges due to the complex geometry of obstacles (trees, cables, lampposts) the aerial vehicle's flightpath or route. Because these challenges, service providers face significant technical issues with respect to providing mapping data (e.g., proper modeling of the three-dimensional word) to enable aerial vehicles to be routed more safely through 3D space, particularly when operating autonomously.

SOME EXAMPLE EMBODIMENTS

Therefore, there is a need for providing aerial route calculation in a 3D space based, for instance, on pre-computed collision probability data mapped to the 3D space. There is also a need for encoding the collision-probability-based aerial route for transmission to a routing client and then decoding the aerial route at the client.

According to one embodiment, a method comprises determining a root 3D shape (e.g., cube) encompassing an aerial route through a 3D space. The 3D space is partitioned into a hierarchy of 3D shapes, and the aerial route comprises a list of 3D shape identifiers (IDs) (e.g., a cube ID) corresponding to one or more of the 3D shapes in the hierarchy that form the aerial route. The method also comprises recursively performing a comparison of a respective 3D shape ID of the root 3D shape or one or more child shapes of the root 3D shape to the list of 3D shape IDs of the aerial route. The method further comprises generating a traversal command list by selectively adding each of the respective 3D shape ID to the traversal command list that matches at least one 3D shape ID of the aerial route or includes the least one shape ID of the aerial route as a child 3D shape ID. The method further comprises providing the traversal command list as an output representing the aerial route.

According to another embodiment, an apparatus comprises at least one processor, and at least one memory including computer program code for one or more computer programs, the at least one memory and the computer program code configured to, with the at least one processor, cause, at least in part, the apparatus to determine a root 3D shape (e.g., cube) encompassing an aerial route through a 3D space. The 3D space is partitioned into a hierarchy of 3D shapes, and the aerial route comprises a list of 3D shape identifiers (IDs) (e.g., a cube ID) corresponding to one or more of the 3D shapes in the hierarchy that form the aerial route. The apparatus is also caused to recursively perform a comparison of a respective 3D shape ID of the root 3D shape or one or more child shapes of the root 3D shape to the list of 3D shape IDs of the aerial route. The apparatus is further caused to generate a traversal command list by selectively adding each of the respective 3D shape ID to the traversal command list that matches at least one 3D shape ID of the aerial route or includes the least one shape ID of the aerial route as a child 3D shape ID. The apparatus is further caused to provide the traversal command list as an output representing the aerial route.

According to another embodiment, a computer-readable storage medium carries one or more sequences of one or more instructions which, when executed by one or more processors, cause, at least in part, an apparatus to determine a root 3D shape (e.g., cube) encompassing an aerial route through a 3D space. The 3D space is partitioned into a hierarchy of 3D shapes, and the aerial route comprises a list of 3D shape identifiers (IDs) (e.g., a cube ID) corresponding to one or more of the 3D shapes in the hierarchy that form the aerial route. The apparatus is also caused to recursively perform a comparison of a respective 3D shape ID of the root 3D shape or one or more child shapes of the root 3D shape to the list of 3D shape IDs of the aerial route. The apparatus is further caused to generate a traversal command list by selectively adding each of the respective 3D shape ID to the traversal command list that matches at least one 3D shape ID of the aerial route or includes the least one shape ID of the aerial route as a child 3D shape ID. The apparatus is further caused to provide the traversal command list as an output representing the aerial route.

According to another embodiment, an apparatus comprises means for determining a root 3D shape (e.g., cube) encompassing an aerial route through a 3D space. The 3D space is partitioned into a hierarchy of 3D shapes, and the aerial route comprises a list of 3D shape identifiers (IDs) (e.g., a cube ID) corresponding to one or more of the 3D shapes in the hierarchy that form the aerial route. The apparatus also comprises means for recursively performing a comparison of a respective 3D shape ID of the root 3D shape or one or more child shapes of the root 3D shape to the list of 3D shape IDs of the aerial route. The apparatus further comprises means for generating a traversal command list by selectively adding each of the respective 3D shape ID to the traversal command list that matches at least one 3D shape ID of the aerial route or includes the least one shape ID of the aerial route as a child 3D shape ID. The apparatus further comprises means for providing the traversal command list as an output representing the aerial route.

According to one embodiment, a method comprises receiving an aerial route through a 3D space. The 3D space is partitioned into a hierarchy of 3D shapes (e.g., cubes), and the aerial route includes a traversal command list of 3D shape identifiers (IDs) (e.g., cube IDs) corresponding to one or more of the 3D shapes in the hierarchy associated with the aerial route and a respective traversal instruction for each of the 3D shape IDs in the traversal command list. The method also comprises generating a decoded path list by selectively adding said each of the 3D shape IDs in the traversal command list to the path list based on the respective traversal instruction. The method further comprises providing the decoded path list as an output.

According to another embodiment, an apparatus comprises at least one processor, and at least one memory including computer program code for one or more computer programs, the at least one memory and the computer program code configured to, with the at least one processor, cause, at least in part, the apparatus to receive an aerial route through a 3D space. The 3D space is partitioned into a hierarchy of 3D shapes (e.g., cubes), and the aerial route includes a traversal command list of 3D shape identifiers (IDs) (e.g., cube IDs) corresponding to one or more of the 3D shapes in the hierarchy associated with the aerial route and a respective traversal instruction for each of the 3D shape IDs in the traversal command list. The apparatus is also caused to generate a decoded path list by selectively adding said each of the 3D shape IDs in the traversal command list to the path list based on the respective traversal instruction. The apparatus is further caused to provide the decoded path list as an output.

According to another embodiment, a computer-readable storage medium carries one or more sequences of one or more instructions which, when executed by one or more processors, cause, at least in part, an apparatus to receive an aerial route through a 3D space. The 3D space is partitioned into a hierarchy of 3D shapes (e.g., cubes), and the aerial route includes a traversal command list of 3D shape identifiers (IDs) (e.g., cube IDs) corresponding to one or more of the 3D shapes in the hierarchy associated with the aerial route and a respective traversal instruction for each of the 3D shape IDs in the traversal command list. The apparatus is also caused to generate a decoded path list by selectively adding said each of the 3D shape IDs in the traversal command list to the path list based on the respective traversal instruction. The apparatus is further caused to provide the decoded path list as an output.

According to another embodiment, an apparatus comprises means for receiving an aerial route through a 3D space. The 3D space is partitioned into a hierarchy of 3D shapes (e.g., cubes), and the aerial route includes a traversal command list of 3D shape identifiers (IDs) (e.g., cube IDs) corresponding to one or more of the 3D shapes in the hierarchy associated with the aerial route and a respective traversal instruction for each of the 3D shape IDs in the traversal command list. The apparatus also comprises means for generating a decoded path list by selectively adding said each of the 3D shape IDs in the traversal command list to the path list based on the respective traversal instruction. The apparatus further comprises means for providing the decoded path list as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a diagram illustrating an example output encoding a route as a set of 3D volumes, according to one embodiment;

DESCRIPTION OF SOME EMBODIMENTS

Examples of a method, apparatus, and computer program for providing an aerial route through a three-dimensional (3D) space using collision probability data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
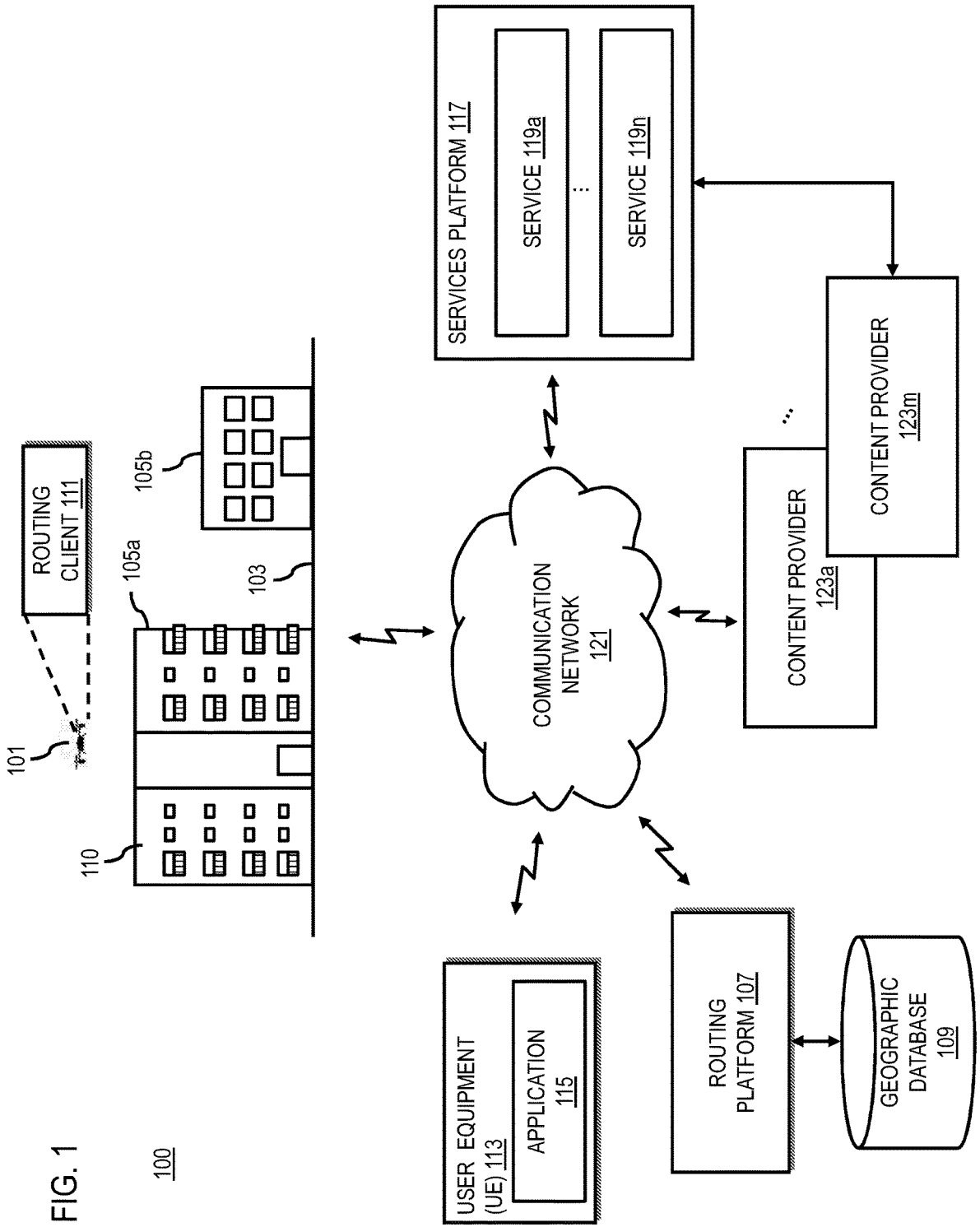
FIG. 1 is a diagram of a system capable of calculating an aerial route using a collision probability space, according to one embodiment.

FIG. 1 is a diagram of a system capable of calculating an aerial route using a collision probability space, according to one embodiment. The use of manned or unmanned aerial vehicles is becoming more widespread, leading to greater concern about flight safety with respect to aerial vehicle itself as well as the environment or 3D space in which it is operating. Generally, an aerial vehicle 101 operates by flying above streets 103, buildings 105a and 105b (also collectively referred to as buildings 105), and/or other complex 3D spaces where safety risks to the public and/or the aerial vehicle 101 are often present. Aerial routing in such a 3D environment presents unique challenges due, for instance, to the complex geometry of obstacles (e.g., buildings 105, trees, cables, lamp posts, etc.) present within the environment. For example, the absence of proper modeling of the 3D world results in the aerial vehicle 101's having to rely solely on onboard sensors for obstacle detection, or on human operators, to navigate around obstacles or other collision risks in the environment.

In other words, aerial vehicles 10 historically rely on onboard sensors and/or human operators to navigate complex 3D environments. Moreover, common obstacles are often avoided by routing the aerial vehicle 101 to fly over known road networks and/or at a higher altitude to minimize risks. These traditional heuristics for aerial routing may not be applicable in all cases, thereby potentially preventing autonomous aerial vehicles 101 from gaining wider adoption.

Further, by relying on simple heuristics or solely on onboard sensors, no estimate or only a less specific estimate can be made of the risk of the planned path or route of the aerial vehicle 101. This lack of visibility on potential loss or risks can prevent reliable usage of aerial vehicles 101. Therefore, service providers face significant technical challenges when assessing and then presenting the risks associated with a calculated aerial route (e.g., a collision probability of the aerial vehicle 101).

To address these technical challenges, the system 100 of FIG. 1 introduces a capability to provide route calculation in a 3D environment using a pre-computed collision-probability route network. In one embodiment, the system 100 of FIG. 1 includes a routing platform 107) to compute an aerial or 3D route from point A to point B for an aerial vehicle 101 (e.g., a drone) using a collision-probability 3D map (e.g., as stored in a geographic database 109). In another embodiment, the system 100 of FIG. 1 includes a routing client 111 (e.g., in the aerial vehicle 101) that interacts with the routing platform 107 for the computation and receiving of an aerial route from point A to point B for the aerial vehicle 101 using a collision-probability 3D map. By way of example, the various embodiments described enable aerial or 3D routes to be computed for aerial vehicles 101 using a collision-probability graph. This has the advantage of providing important survival probabilities to the aerial vehicle 101 that can be used to preempt client-side maneuvers, as well as valuable information for operators, dispatch systems, etc. of the aerial vehicles 101 (e.g., for risk planning, loss prevention, dispatching an appropriate aerial vehicle 101, etc.).

Figure 2:
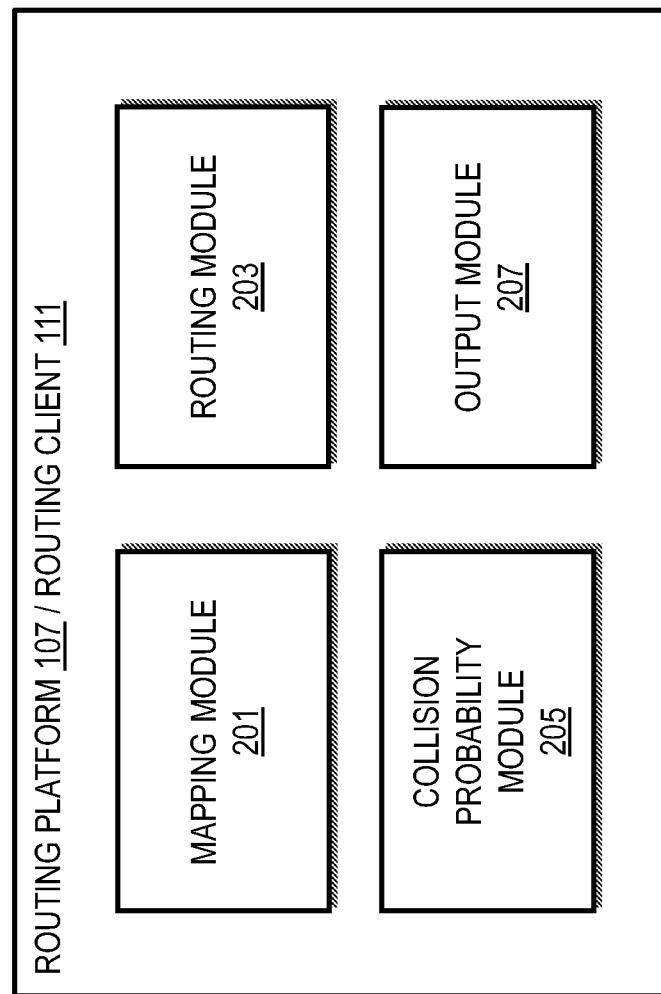
FIG. 2 is a diagram of the components of an aerial routing platform and/or routing client, according to one embodiment.

FIG. 2 is a diagram of the components of the aerial routing platform 107 and/or routing client 111, according to one embodiment. In one embodiment, the routing platform 107 and/or routing client 111 include one or more components for providing and using an aerial or 3D route based on a collision-probability map, according to the various embodiments described herein. As shown in FIG. 2, the routing platform 107 and/or routing client include a mapping module 201, a routing module 203, a collision probability module 205, and an output module 207. The above presented modules and components of the routing platform 107 and/or routing client 111 can be implemented in hardware, firmware, software, or a combination thereof. It is contemplated that the functions of these components may be combined or performed by other components of equivalent functionality. Though depicted as separate entities in FIG. 1, it is contemplated that the routing platform 107 and/or routing client 111 may be implemented as a module of any of the components of the system 100 (e.g., a component of the aerial vehicle 101, a client device such as a user equipment (UE) device 113 executing the routing client 111 as an application 115, a services platform 117, one or more services 119a-119n of the services platform 117, etc.). In another embodiment, the routing platform 107, routing client 111, and/or one or more of the modules 201-207 may be implemented as a cloud-based service, local service, native application, or combination thereof. The functions of these modules are discussed with respect to FIGS. 3-10 below.

Figure 3:
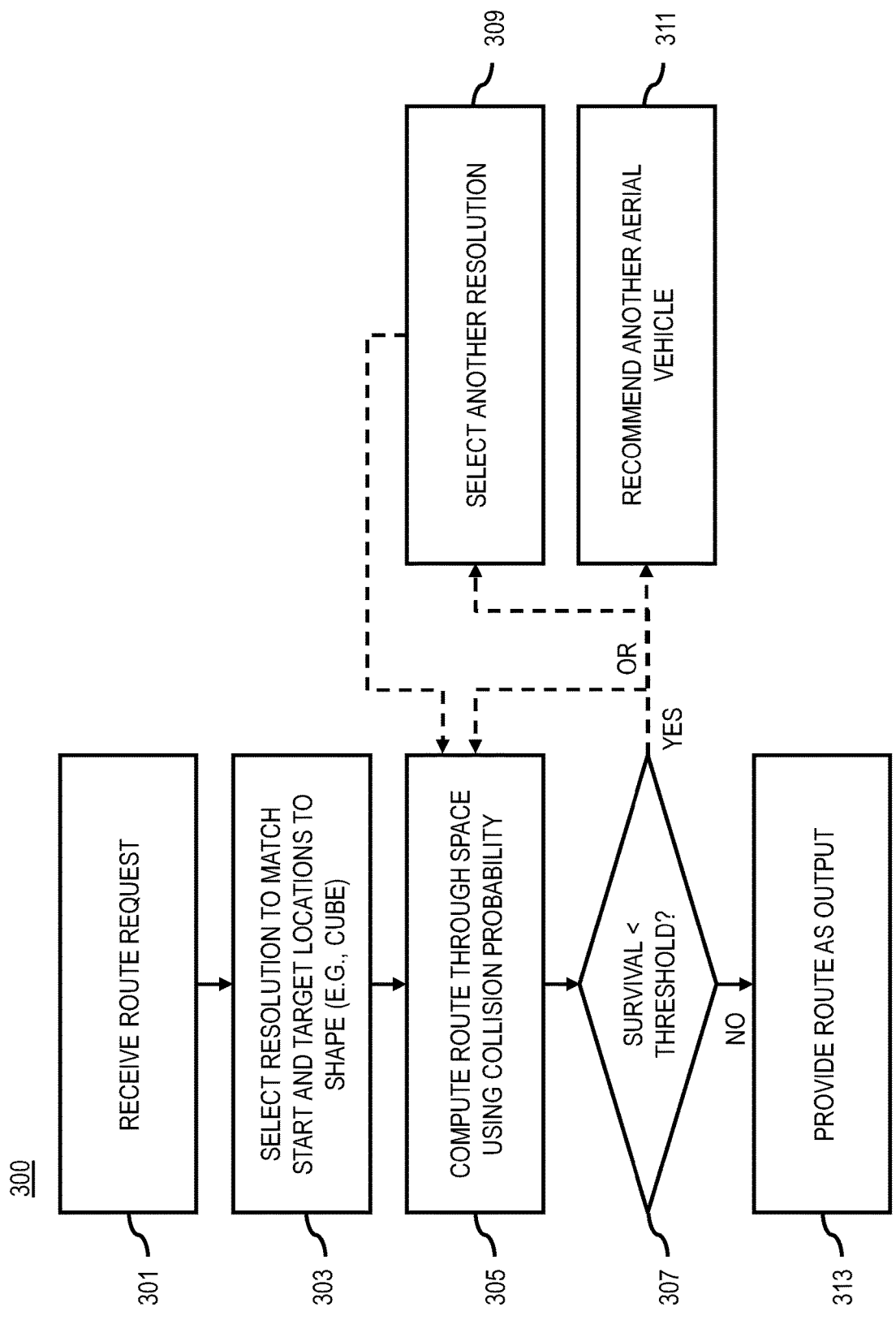
FIG. 3 is a flowchart of a process for calculating an aerial route using a collision probability space, according to one embodiment.
Figure 16:
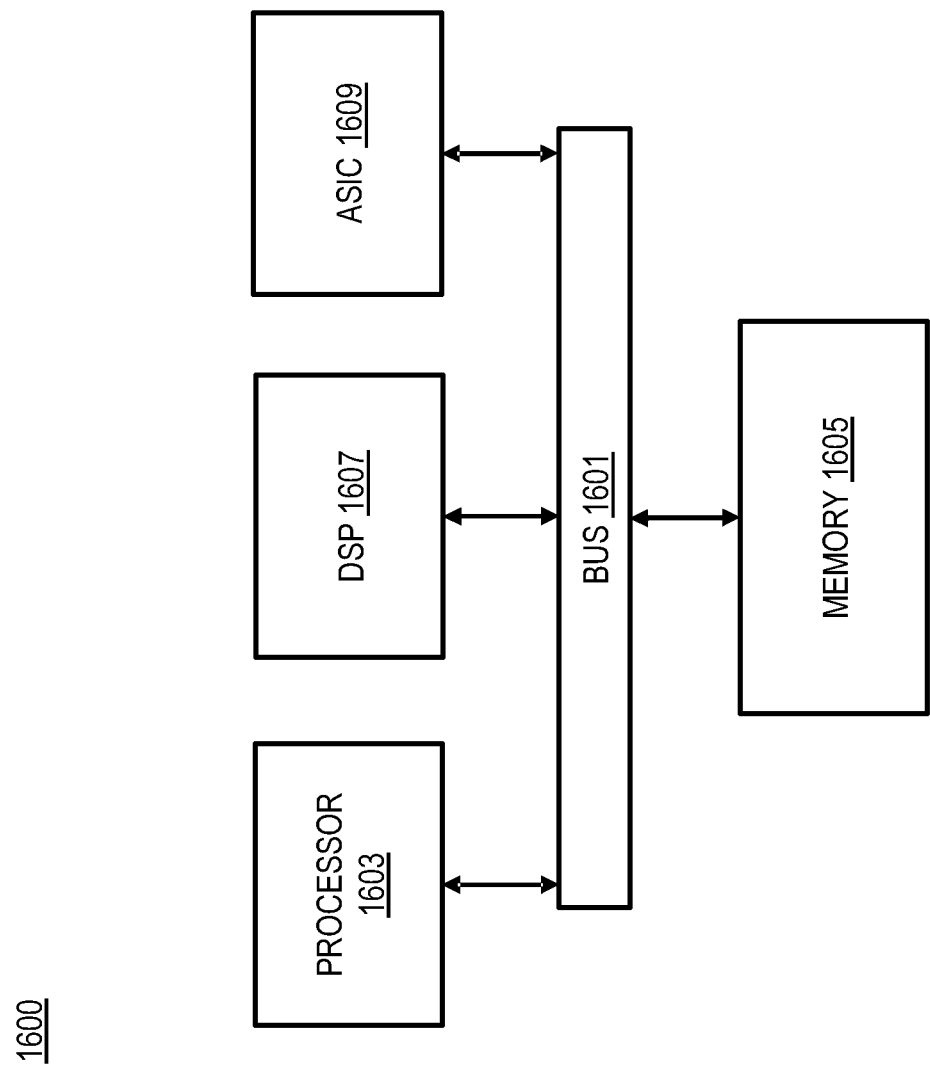
FIG. 16 is a diagram of a chip set that can be used to implement an embodiment.

FIG. 3 is a flowchart of a process for calculating an aerial route using a collision probability space, according to one embodiment. In various embodiments, the routing platform 107 and/or any of the modules 201-207 of the routing platform 107 may perform one or more portions of the process 300 and may be implemented in, for instance, a chip set including a processor and a memory as shown in FIG. 16. As such, the routing platform 107 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, to perform the process 300, the mapping module 201 of the routing platform 107 has access to a 3D collision-probability map that can be used to calculate an aerial route. The 3D collision-probability map can be queried from a geographic database 109 that stores the collision-probability data at variable resolution. The geographic database 109 can be a cloud-based database that includes the latest or most up-to-date version of the collision-probability as well as the underlying map data. In one embodiment, the variable resolution can be defined with respect a common 3D coordinate system (e.g., X, Y, Z coordinate system) shared by both the routing platform 107 and the routing client 111.

Figure 4A:
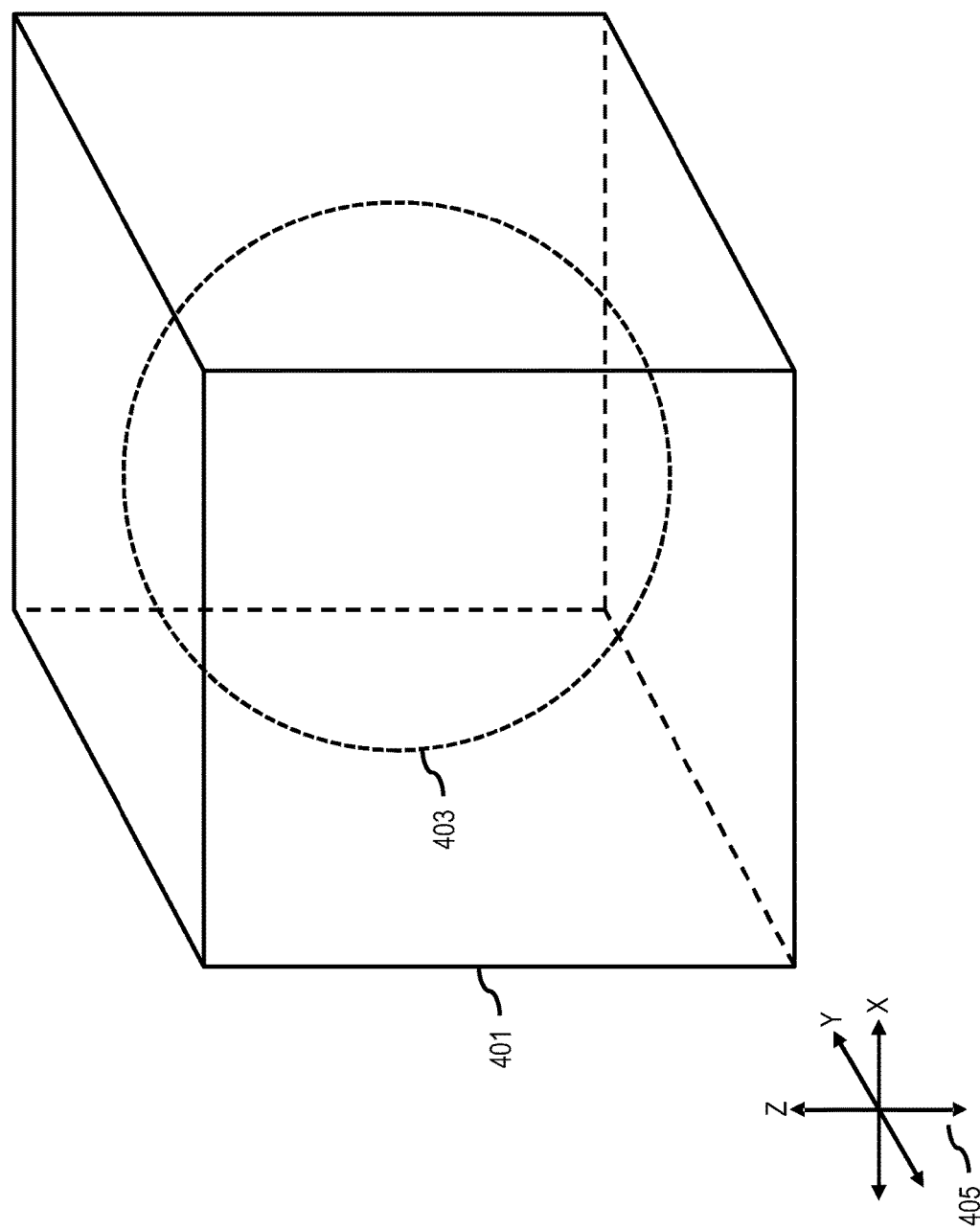
FIGS. 4A-4C are diagrams illustrating an example representation of a 3D space as discrete 3D volumes (e.g., cubes or other equivalent 3D shapes) for calculating an aerial route, according to one embodiment.
Figure 4B:
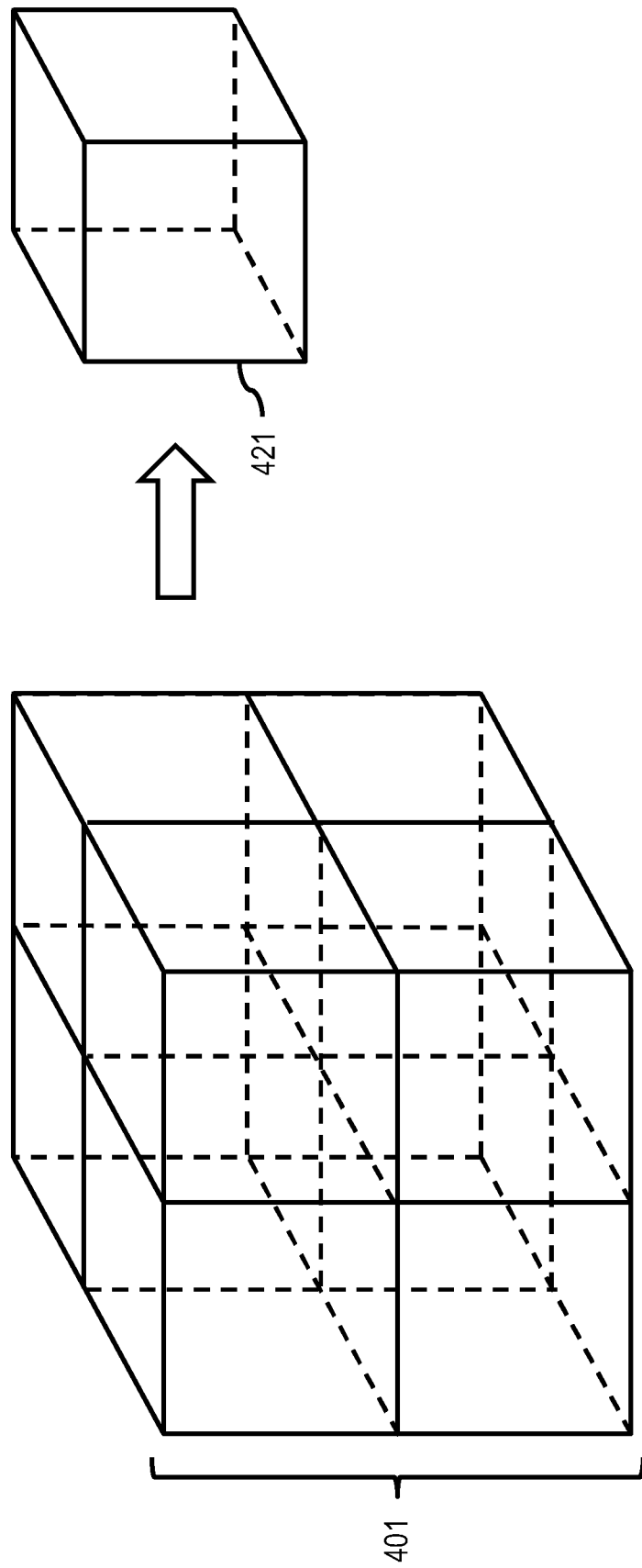

In one embodiment, the 3D coordinate system can be a global coordinate system that defines a 3D location on or above the Earth using X, Y, Z coordinates. The 3D space on or surrounding the Earth can also be represented using 3D shapes defined at a variable resolution. FIGS. 4A and 4B are diagrams illustrating an example representation of a 3D space as discrete volumes/partitions (e.g., cubes or other equivalent 3D shapes) for calculating an aerial route, according to one embodiment. Under this representation, a maximum or largest 3D volume is defined to enclose the space of interest. In this example, the 3D volume selected is a cube 401 and the space of interest is the entire Earth 403.

It is noted however, that the space of interest can be a space of any size that covers Earth 403 only partially or that covers any other heavenly body (e.g., moon) or other space (e.g., including extraterrestrial space). Locations in the cube 401 are given in a 3D X, Y, Z coordinate system. As shown, the Earth cube 401 is cube of length 16,000 km. At the center of this Earth cube 401 is the Earth 403 (e.g., radius equal to 6371 km), centered at coordinates (8,000 km, 8,000 km, 8,000 km). Hence, the Earth cube 401 fully covers the earth plus approximately 1,500 km of atmosphere. Any point within the Earth cube 401 can be easily converted from and to a latitude, longitude, and altitude coordinate system. However, in this example, an X, Y, Z coordinate system is more suitable for 3D maps.

As shown in FIG. 4B, for a given partitioning level or resolution of the initial Earth cube 401, the Earth cube can be partitioned into level^3 equal-sized cubes. In the example shown, at a partitioning or resolution level of 2, the Earth cube 401 is partitioned into 2^3 or 8 equal-sized cubes. At a partitioning level of 3, the Earth cube 401 is partitioned into 3^3 or 27 equal-sized cubes; at a partitioning level of 4, the Earth cube 401 is partitioned into 4^3 or 64 equal-sized cubes; and so on. A single partition or 3D volume 421 can be addressed by its center in 3D X, Y, Z coordinates, as well as the partitioning level from which its volume (e.g., the amount of 3D space the cube represents) can be derived. In one embodiment, each partition or 3D volume 421 is called a CUBE with its CUBE-ID defined at its center X, Y, Z coordinates and the corresponding partitioning or resolution level. Furthermore, each face of the cube 421 is assigned a unique identifier (ID) (e.g., CUBE-ID-0, . . . , CUBE-ID-5, where the numeral after CUBE-ID corresponds to a respective face of the cube or other 3D shape).

Figure 4C:
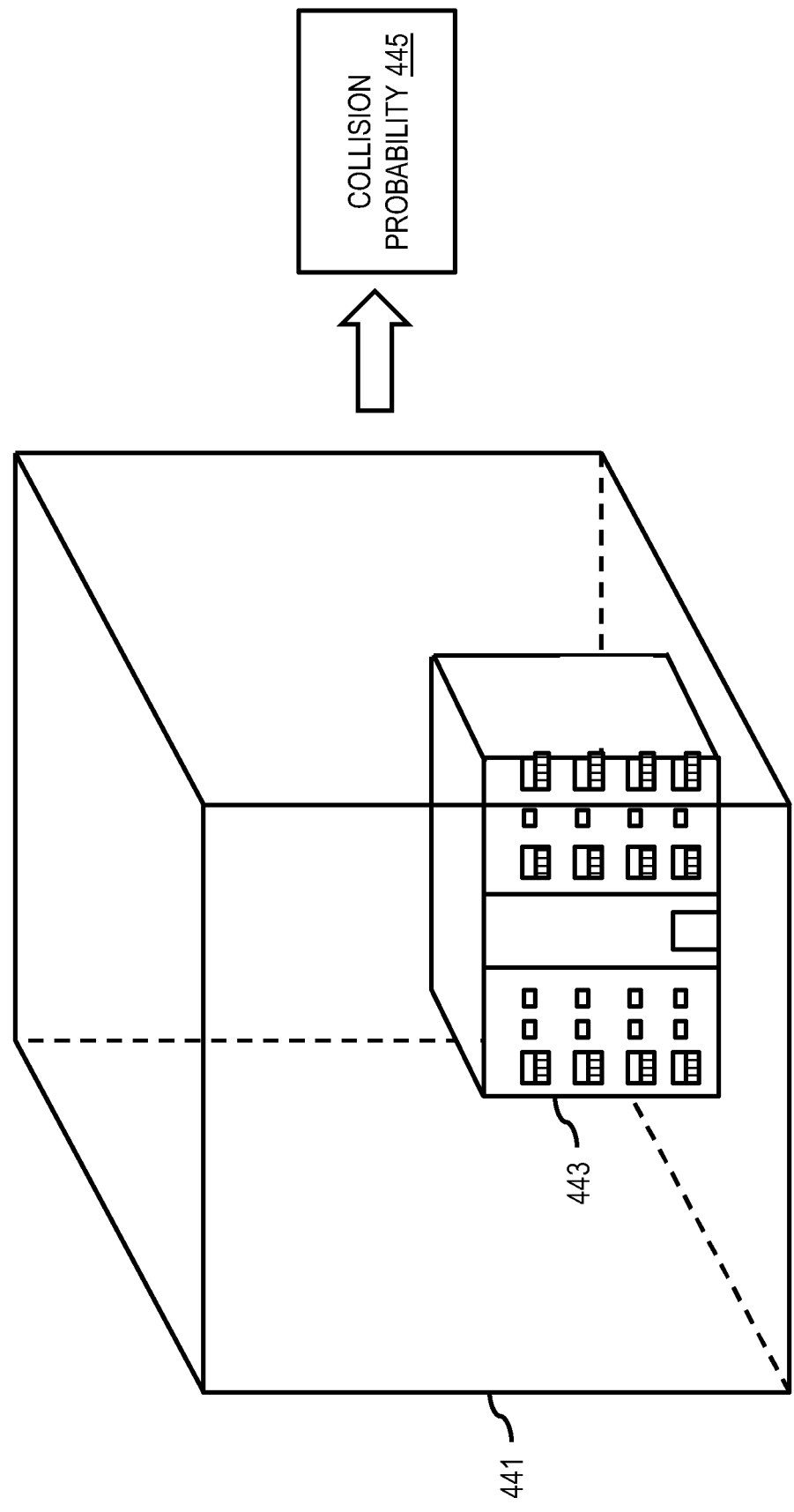

In one embodiment, to create the collision probability map, each cube or 3D volume is assigned a collision probability. By way of example, the collision probability can be determined by intersecting the space corresponding to the cube or other 3D shape with the 3D map of the geographic database 109. The 3D map, for instance, can include 3D models of structures (e.g., buildings), obstacles (e.g., wires, lamp posts, trees, etc.), and/or another map feature or element that can potentially pose a survival risk to aerial vehicles 101. In one embodiment, the collision probability is calculated as the ratio of the cube or 3D volume space that does not contain or is not contained in an element of the 3D map to the total volume of the cube or other 3D shape. For example, as shown in FIG. 4C the space corresponding to a cube 441 is used to query the geographic database 109 for 3D map data of the space. In this example, the query returns a 3D model 443 of a building that represents the dimensions of the building in space. The collision probability 445 can then be calculated based on the ratio of the space of the cube 441 that is not occupied by the 3D model 443 to the total volume of the cube 441. In other words, if the map data indicates that a greater proportion of the cube 441 is occupied by map elements, then the probability that an aerial vehicle 101 (e.g., drone) will collide with one of the elements is greater. In one embodiment, other external variables applicable to the space of the corresponding cube (e.g., wind patterns, historical collision data, etc.) may also be used as a parameter in determining the collision probability of the cube or other 3D shape. Other examples of external factors include but are not limited to: (1) population or people density under a route; (2) presence of electromagnetic fields; (3) absence of GPS or other location signals; (4) other weather conditions; (5) network (e.g., cellular network) coverage; and (6) aviation-related data (e.g., air traffic, etc.).

In one embodiment, the collision probability may be calculated for any partition level of resolution of the 3D map to create a collision-probability map. The collision probability map can be pre-computed and/or generated in real-time. In some embodiments, the collision probability can be computed separately for each partitioning level. In other embodiments, the collision probability for a cube at a partitioning level i is given by the cubes at partitioning level i+1 contained in it. For example, a cube at level i will have eight cubes contained within it that are at level i+1 each with respective collision probabilities (e.g., p_1-p_8). Then the collision probability for the cube at level i can be computed as $1-(1-p\_1)*(1-p\_2)* \ldots *(1-p\_8)$. In one embodiment, this property enables some optimizations to be made when probing for routes in a high-resolution map, as larger areas of the map may be explored at once.

Based on the representation above, the routing module 203 can generate a collision-probability routing graph as a weighted graph G=(V,E), where V is the set of faces of all cubes in the map partition covering the route, and E is the set of cubes (if more than one cube), weighted by the probability of successful navigating (e.g., navigating without failure or collision) inside each cube or 3D volume as described in further detail below.

For example, in step 301 of the process 300, the routing module 203 of the routing platform 107 receives a request to route the aerial vehicle through a 3D space from a start location to a target location. The start and end locations (e.g., START/TARGET) are identified in the X, Y, Z coordinate system described in the embodiments above. In step 303, the routing module 203 picks or selects an arbitrary resolution R size for the map partition and matches the START and TARGET coordinates to the closest respective face of the cubes or other 3D shapes in that resolution. For example, the faces of the cube corresponding to the START or TARGET can be labeled as CUBE ID START and CUBE ID END.

Figure 5:
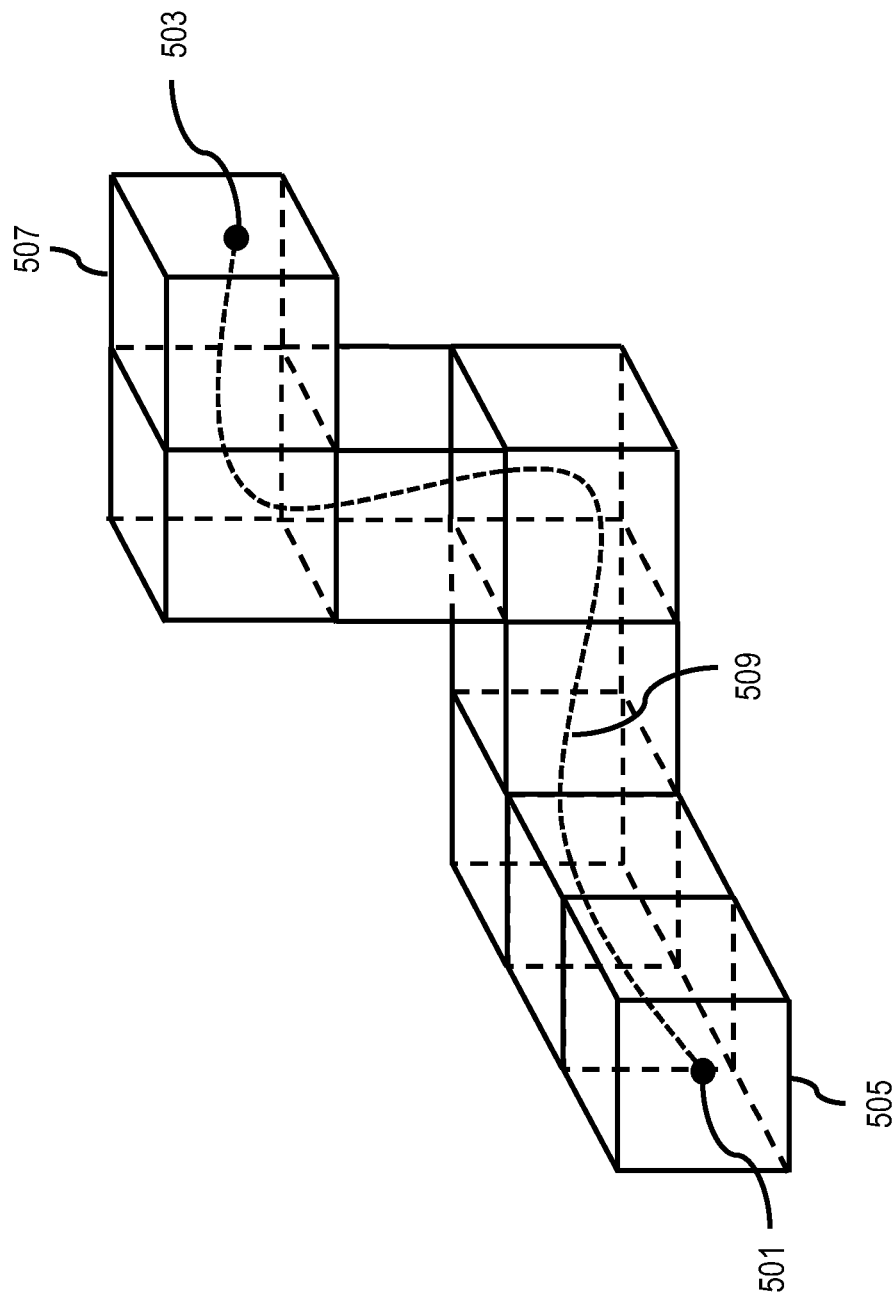
FIG. 5 is a diagram illustrating an example of representing a 3D route as a set of three-dimensional shapes (e.g., cubes or other equivalent 3D shapes), according to one embodiment.

In other words, the routing module 203 matches the start location and the target location specified in the routing request to a corresponding start shape and a target shape representing the 3D space. An example of this matching is illustrated in FIG. 5. As shown, a routing request is received specifying a start location 501 and a target location 503 using an X, Y, X coordinate system common to the requesting device (e.g., the aerial vehicle 101 or the routing client 111) and the routing platform 107. The routing module 203 matches the start location 501 to a corresponding start cube 505 at a selected resolution and matches the target location to a corresponding target cube 507 at the same resolution. It is contemplated that the routing module 203 can the resolution using any process or mechanism such as but not limited to a length of the route, map region, available map data, and/or the like.

In step 305, the routing module 203 then computes a route on the partition network using a modified Dijkstra algorithm or equivalent routing algorithm. The partition network, for instance, refers to the cubes or 3D shapes representing the 3D space in which the route is being computed. The faces of the cubes (or more generally the surfaces of the 3D shapes) of the partition network adjoin to enable the computation of a path the through the network. The routing module 203 uses the modified Dijkstra algorithm or any other equivalent routing algorithm to determine the path or route.

In one embodiment, the routing module 203 computes the route through the plurality of three-dimensional shapes from the start shape to the target shape based on a collision probability determined based on a first probability of survival due to volume-related factors, a second probability of survival due to aerial-vehicle-related factors, or a combination thereof for the plurality of three-dimensional shapes from the start shape to the target shape. For example, the routing module 203 interacts with the collision probability module 205 to determine factors for input into the routing algorithm (e.g., as cost factors). For example, a probability of survival due to cube-related (or shape-related) factors on a given cube i is given by $P\_survival = 1 - P\_i$. In one embodiment, the collision probability module 205 can compute the probability of survival due to shape-related factors ($P\_survival$) from collision probability for the cube or 3D shape from the 3D map of the geographic database 109 (e.g., as described in the embodiments above). In addition, the collision probability module 205 can consider external factors (e.g., real-time contextual factors) associated with the cube or shape including but not limited to wind, historical collision data, weather, visibility, etc.

In addition or alternatively, the collision probability module 205 can compute a second or alternate probability of survival due to intrinsic errors or factors of the aerial vehicle 101 (e.g., battery, wear and tear, etc.). In one embodiment, the probability of survival due to aerial-vehicle-related factors can be given or computed as a function of the number N of cubes or 3D shapes at the current resolution that the aerial vehicle 101 is predicted to traverse before the aerial vehicle 101 is predicted to fail or die because of internal problems due to the one or more intrinsic factors. For a resolution R, the probability of survival due to aerial-vehicle-related factors, for instance, can be denoted as $P\_traversal$ and can be calculated as: $P\_failure = 1/N$ and then $P\_traversal = 1 - P\_failure$.

In one embodiment, the probability of survival after traversing cube i given both factors (e.g., probability of survival due to shape-related factors and probability of survival due to aerial-vehicle-related actors) is $P = P\_survival * P\_traversal$. The collision probability module 205 can then compute the cost of expanding a node i in the partition network to include traversal of cube i in a route as $-\log(P)$. The routing module 203 hence uses the Dijkstra or equivalent routing algorithm to compute the path or route that minimizes the sum of $-\log(P)$ for all cubes or shapes along the path which is equivalent to the path or route that maximizes the product of all P along the route. Thus, this adjustment to the cost computation allows the routing algorithm to maximize the product of survival probability at each cube or shape traversal. This path or route therefore has the highest probability of reaching its destination at the given resolution R. Returning the example of FIG. 5, the route 509 traversing the cubes in between the start cube 505 and target cube 507 has the highest probability of survivability or conversely the lowest probability of collision based on the individual survival probabilities of each of the cubes or shapes traversed by the route 509.

In step 307, if the route computed has a probability of survival that is below a threshold value (e.g., 80%), the routing module 203 can select a different resolution for the map partition or shape representation of the 3D space (step 309). The process 300 then returns to step 305 to compute a route a the newly selected resolution. The threshold probability of survival value can be a system parameter or can be provided in the routing request by the routing client 111. In one embodiment, a lower resolution (e.g., a cube representing a greater volume of the 3D space) or a higher resolution (e.g., a cube representing lesser volume of the 3D space) can be used in an attempt to find a path that meets the target probability of survival threshold value. For example, a lower resolution cube or 3D shape encompassing a larger total volume of space may result in an increase the ratio of unoccupied space to total space, making the collision probability lower. On the other a higher resolution cube or 3D shape may in some cases enable the routing module 203 to find at smaller cube or 3D shape in clear space around an otherwise obstacle dense 3D space.

In one embodiment, the resolution can be selected individually for each different leg of the route. For example, if a traversal through a first cube in the route meets the probability threshold, but the second cube does not, the routing module 203 can select a new resolution for traversing the space corresponding to the second cube while maintaining the original resolution of the first cube.

In step 307, if no route exists with an acceptable survival probability, the routing module 203 can use this expected failure to select another aerial vehicle 101 with higher probability of traversal per cube than the aerial vehicle 101 for which the route was originally computed (step 311). As described above the probability of traversal is a function of both the probability of survival due to cube- or shape-related factors and probability of survival due to aerial-vehicle-related factors. Accordingly, the routing module 203 can recommend or determine another aerial vehicle 101 with a sufficiently high probability of survival due to aerial-vehicle-related factors to increase the overall probability of survival for the cube or shape to meet the threshold survival probability. For example, a heavier duty aerial vehicle 101 or drone with greater range or greater mean time between failure can be selected to complete a route that would otherwise not have an acceptable survival probability.

In another embodiment, the routing module 203 can use the computed survival or collision probability for a given route for other applications including but not limited to selecting an insurance or delivery cost for the aerial vehicle 101 and/or its payload. In this way, the routing module 203 can determine the insurance cost, the delivery cost, and/or the like for the aerial vehicle 101 to fly the route based on the computed collision probability for the route.

In step 313, the output module 207 can encode the computed route, along with the collision probabilities for each cube traversal to send to the aerial vehicle 101, an operator of the vehicle 101, an aerial vehicle service provider, and/or any other designated device or entity. As shown in FIG. 6, encoding the route comprises, for instance, generating an output 601 that includes a ordered list of the cubes or 3D shapes in the route (e.g., labeled according to the embodiments described above by cube and/or face ID) along with the corresponding collision or survival probability. In the example of FIG. 6, the output 601 includes a data structure listing the cube by ID and collision probability as data tuples for cubes 1-*n* of the compute route.

Figure 7:
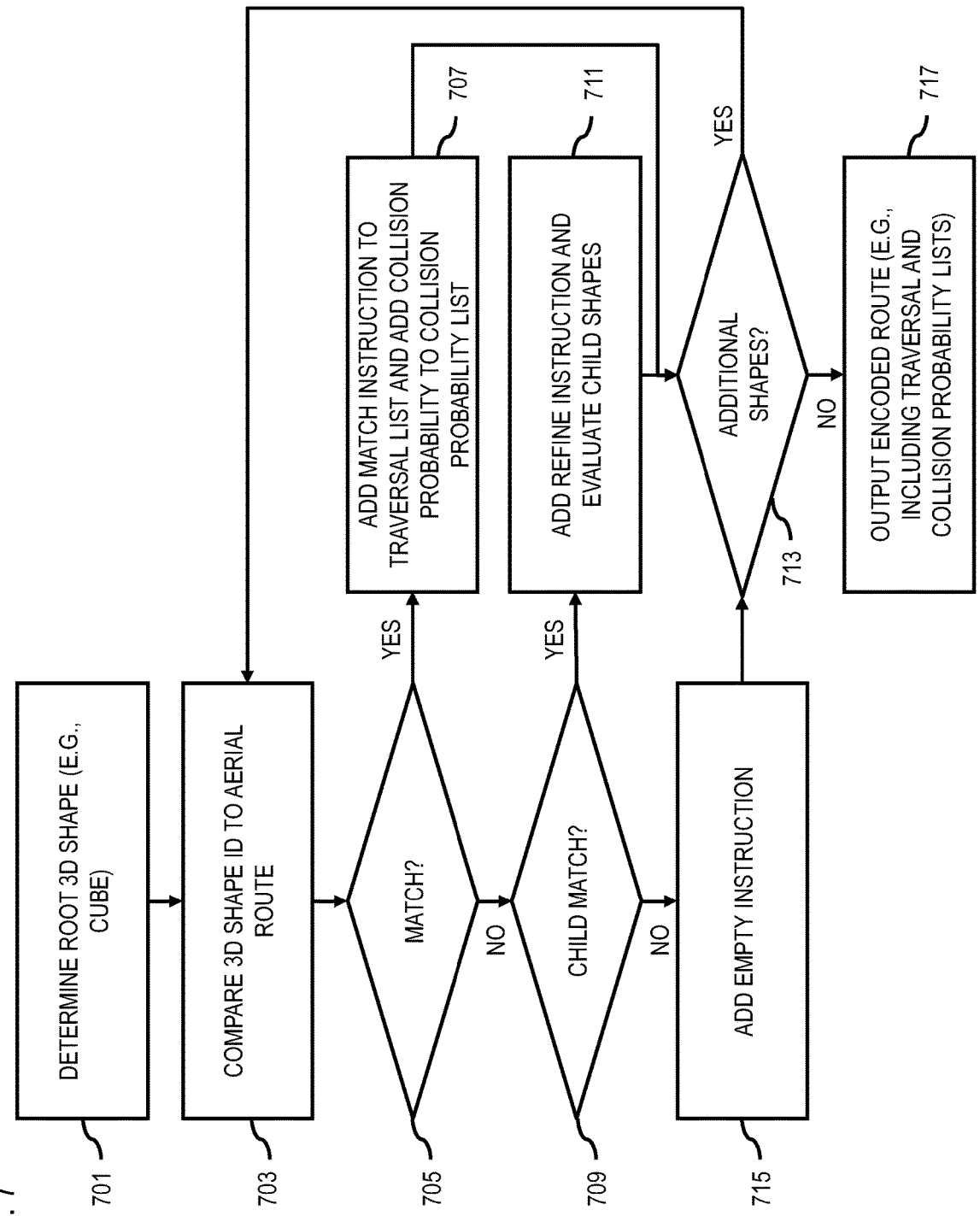
FIG. 7 is a flowchart of a process for encoding an aerial route calculated using a collision probability space, according to one embodiment.

FIG. 7 is a flowchart of a process for encoding an aerial route calculated using a collision probability space, according to one embodiment. In various embodiments, the routing platform 107 and/or any of the modules 201-207 of the routing platform 107 may perform one or more portions of the process 300 and may be implemented in, for instance, a chip set including a processor and a memory as shown in FIG. 16. As such, the routing platform 107 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the routing process 300 of FIG. 3 on a 3D space partitioned as described above, would return an ordered list of cubes or other 3D shapes to be traversed from a given location to a destination (e.g., as illustrated in the example of FIG. 6). Given the hierarchical nature of the partitioning of the 3D space, the path may be composed of cubes or other 3D shapes at different levels of resolution, e.g., expanding over areas with low and uniform traversal risk, and shrinking in areas where specific areas of risk can be avoided.

The various embodiments of the process 700 for encoding an aerial route take advantage of the hierarchical nature of the partition to encode a route as a tree traversal over the hierarchical space with instructions on where to go at each node of the tree. In one embodiment, the instructions include but are not limited to any combination of the following:
  MATCH: flag the current cube as part of the route;
  REFINE: drill into one level deeper of the current cube; and
  EMPTY: skip the current cube, as it is not part of the path.

Then, given a route R, composed of an ordered list of cube or 3D shape IDs and their collision probabilities, the routing module 203 of the routing platform 107 can begin encoding the route. For example, the routing module 203 can initialize an empty list of traversal commands T and initialize an empty list of the cube collision probabilities C. In step 701, the routing module 203 determines a root 3D shape or cube encompassing an aerial route through a 3D space. As noted, the 3D space is partitioned into a hierarchy of 3D shapes at different resolutions, and the aerial route comprises a list of 3D shape IDs corresponding to one or more of the 3D shapes in the hierarchy that form the aerial route. In other words, the routing module 203 starts at a designated resolution level (e.g., level 0 or resolution that covers the most volume of 3D space or otherwise covers the 3D space around the aerial route being encoded), and performs a depth-first walk of the partition hierarchy and encodes the route R.

Figure 8:
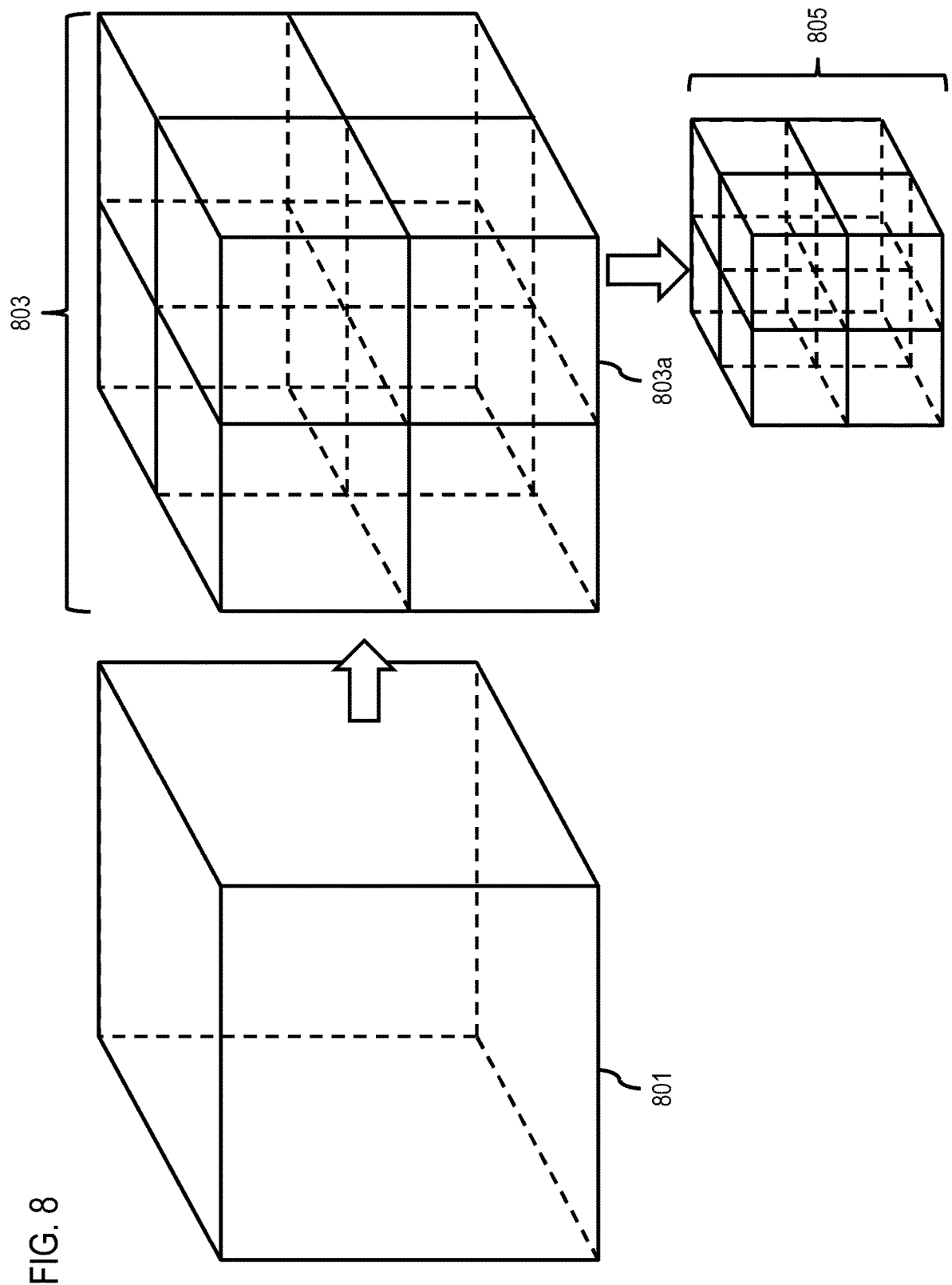
FIG. 8 is diagram illustrating an example of a hierarchical partitioning of a 3D space for encoding an aerial route, according to one embodiment.

FIG. 8 is diagram illustrating an example of a hierarchical partitioning of a 3D space for encoding an aerial route, according to one embodiment. As shown, a root cube 801 is selected an initial resolution. Depending on the extent of the aerial route and the collision probabilities or traversal probability of survival, the route can include cubes or 3D shapes at different resolutions so that portions of the route can be defined with a cubes representing a larger bounding volume of 3D space in areas of relatively low collision probability and cubes representing smaller bounding volumes in areas with higher collision probabilities (e.g., to enable the route to more finely avoid high risk areas). Accordingly, the initial root cube can be segment into 8 equal child cubes 803. Depending on the respective collision probabilities of child cubes 803, one or more of the child cubes 803 can be further partitioned. For example, child cube 803*a* can be further sub-divided into 8 additional child cubes 805, while the other 7 child cubes 803 at the same resolution level as child cube 803*a* are not further partitioned. In general, for partitions based on cubes, each parent cube can be partitioned in 8 child cubes of equal size. This process can continue until a designated maximum resolution or level is reached.

Based on this depth-first walk through the resolution hierarchy of 3D shapes, in step 703, the routing module 203 recursively performs a comparison of a respective 3D shape ID of the root 3D shape or one or more child shapes of the root 3D shape to the list of 3D shape IDs of the aerial route to generate a traversal command list by selectively adding each of the respective 3D shape ID to the traversal command list that matches or does not match at least one 3D shape ID of the aerial route or includes the least one shape ID of the aerial route as a child 3D shape ID.

More specifically, in one embodiment, the routing module 203 initializes an empty list of traversal commands T and an empty list of shape (e.g., cube) collision probabilities C. The routing module 203 then implements an encoding function (ENCODE) with the shape ID (e.g., CUBE-ID) as a function parameter according to the following:

---

ENCODE(CUBE-ID)
    If CUBE-ID equals to any of the CUBE-IDs in aerial route R, e.g., one of the cubes in R has the same bounding volume as the cube denoted by CUBE-ID (step 705):
        Add instruction of MATCH is added to the traversal command list T (step 707);
        The collision probability of the current cube is added to the collision probability list C (step 707); and
        RETURN from the function.
    Else if any of the CUBE-IDs in R is a descendant or child ID of CUBE-ID, e.g., the bounding volume of at least one of the cubes in R is inside the bounding volume of the cube denoted by CUBE-ID (step 709):
        Add instruction of REFINE is added to the traversal command list T (step 711).
        Loop over all eight child IDs CHILD-ID of CUBE-ID (step 713):
            Recursively call ENCODE(CHILD-ID) (e.g., returning to 703 for each CHILD-ID); and
        RETURN from the function.

Else:
    Add instruction of EMPTY is added to the T (step 715).
    RETURN from the function.

In summary, the routing module 203 uses the encoding function, ENCODE(CUBE-ID), to generate a traversal command list by: (1) adding an instruction in the traversal command list to flag the respective 3D shape ID as part of the aerial route based on a comparison indicating the respective 3D shape ID matches the at least one shape ID of the aerial route (e.g., a MATCH instruction); (2) adding an instruction in the traversal command list to drill into one level deeper of the root 3D shape or a currently compared 3D shape based on the comparison indicating that the respective 3D shape ID includes the least one 3D shape ID of the aerial route as the child 3D shape ID (e.g., a REFINE instruction); and (3) adding an instruction in the traversal command list to indicate that the respective 3D shape ID is empty based on the comparison indicating that the respective 3D shape ID does not match the at least one 3D shape ID of the aerial or does not include the at least one 3D shape ID of the aerial route as the child 3D shape ID (e.g., an EMPTY instruction). In one embodiment, at the same time, the routing module 203 generates a collision probability list by adding said each of the respective 3D shape IDs that matches the least one 3D shape ID of the aerial route and a corresponding collision probability to the collision probability list. The collision probability data, for instance, is included in (e.g., during the route generation process) and therefore, determined from the aerial route.

After the routing module 203 generates the traversal command list T and/or collision probability list C as described in the embodiments above, the output module 207 can encode the traversal command list T and/or collision probability list C for transmission to a routing client. It is contemplated that the output module can use any binary encoding scheme or mechanism. For example, in one embodiment, the output module 207 can use a binary representation of one or more traversal instructions included in the traversal command list as part of the encoding scheme. Given that in one embodiment, there are three possible decisions or instructions to make, they could for example be encoded into 1.5 bits. As described above, the traversal instructions include but are not limited to a first instruction indicating no match between the respective 3D shape ID and the at least one 3D shape ID of the aerial route (e.g., EMPTY), a second instruction indicating that the 3D shape ID includes the at least one 3D shape ID of the aerial route as the child 3D shape ID (e.g., REFINE), and a third instruction indicating that the respective 3D shape ID and the at least one 3D shape ID of the aerial route match (e.g., MATCH). Thus, in one embodiment, the traversal command list T can be encoded as a variable-length bit array.

It is noted that EMPTY is the most likely command. Therefore, in one embodiment, the output module 207 can a simple Huffman or equivalent encoding for T:
    EMPTY as 0;
    REFINE as 10; and
    MATCH as 11.

Figure 9:
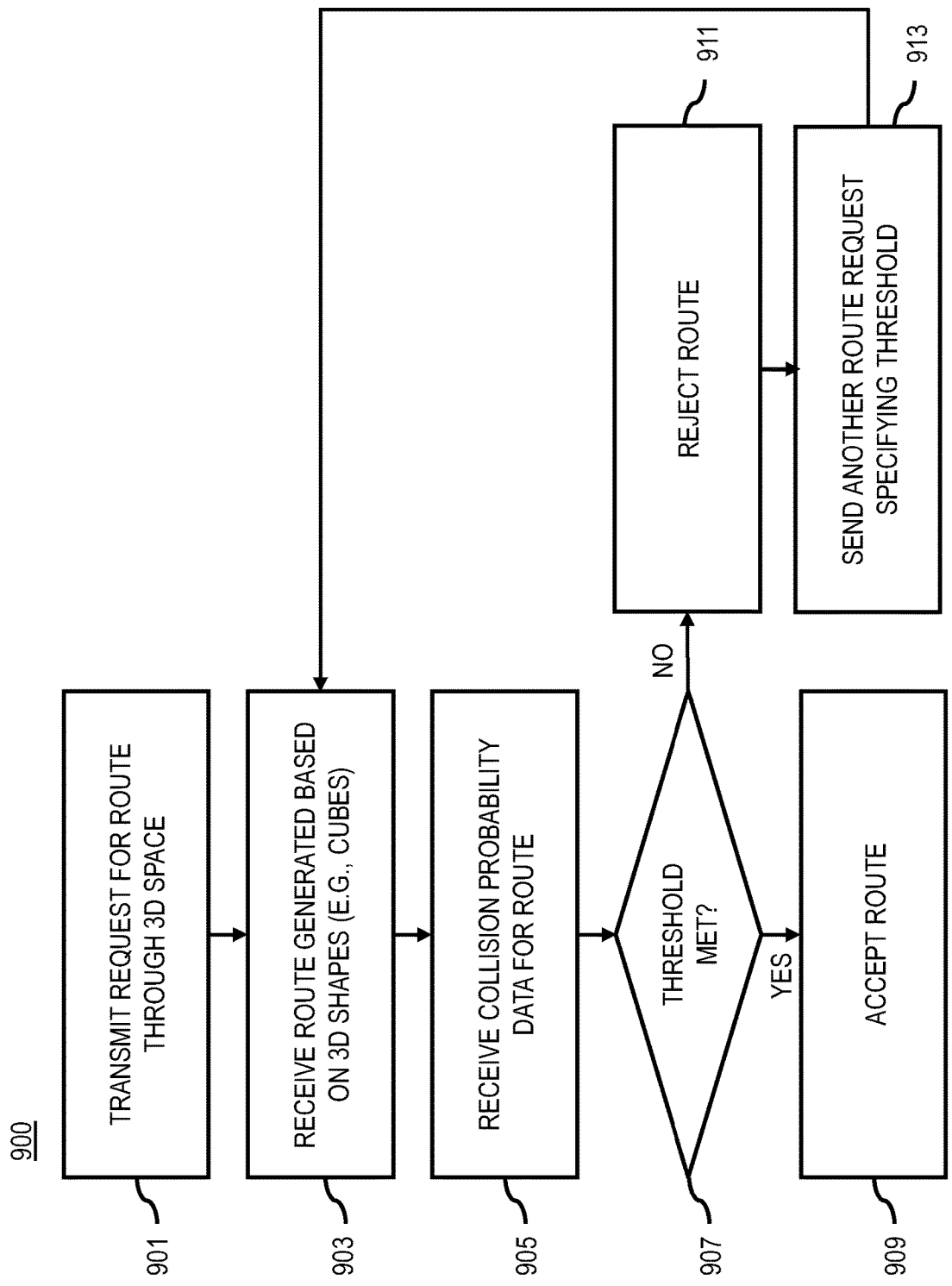
FIG. 9 is a flowchart of a process for receiving an aerial route calculated based on a collision probability space, according to one embodiment.

FIG. 9 is a flowchart of a process for receiving an aerial route calculated based on a collision probability space, according to one embodiment. In various embodiments, the routing client 111 and/or any of the modules 201-207 of the routing client 111 may perform one or more portions of the process 900 and may be implemented in, for instance, a chip set including a processor and a memory as shown in FIG. 16. As such, the routing client 111 and/or the modules 201-207 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

In step 901, the routing module 203 of the routing client 111 transmits a request to the routing platform 107 by encoding a start location and a target location in the X, Y, Z coordinate system common to both the routing client 111 and routing platform 107 as described in the embodiments above.

In response to the routing request, the routing module 203 receives an aerial route generated based on collision probability/probability of survival according to embodiments of the process 300 of FIG. 3 (step 903). For example, the route matches the start location and the target location specified in the request respectively to a start shape (e.g., start cube) and target shape (e.g., target cube) of the 3D shapes representing the 3D space. The route would then comprise the start shape, the target shape, and a set of the plurality of three-dimensional shapes traversing from the start shape to the target shape. The routing module 203 also receives collision probability data for cubes or 3D shapes in the route (step 905). The route, for instance, is an encoded ordered list of cube ids (or other 3D shape IDs) and their collision probability as illustrated in FIG. 6. In one embodiment, the collision probability is computed as a probability of survival based on both cube-related and aerial-vehicle related factors that represents the likelihood of a successful traversal of the corresponding cube or 3D shape.

In step 907, the routing module 203 of the routing client 111 checks the expected probability of survival for the route and may choose to reject or to accept the route by comparing the probability of survival to a threshold value. In step 909, based on determining that the probability of survival of the route meets or exceeds the threshold value, the routing module 203 can accept the route. In one embodiment, on acceptance of the route, the routing module 203 can configure the aerial vehicle 101 to operate or follow the route as described with respect to the process 1000 of FIG. 10 below.

In step 911, based on determining that the probability of survival of the received route is not acceptable (e.g., is below the designated survival probability threshold), the routing module 203 can reject the received route. Then, in step 913, the routing module 203 can transmit a request for another route with a probability threshold hint. In other words, the routing module 203 can specify the desired or acceptable probability threshold for the routing platform 107 to use when computing the route. Alternatively, the routing client 203 can include the probability threshold hint in the initial routing request. After returning to step 903 and receiving the new route, the routing module 203 can reevaluate the probability of survival of the new route for acceptability and repeat the process until and acceptable route is received or no further routes are available from the routing platform 107 that meet the probability threshold.

In one embodiment, after accepting the route generated by the routing platform 107, the routing client 111 can configure an aerial vehicle 101 to perform the route according to FIG. 10 below.

Figure 10:
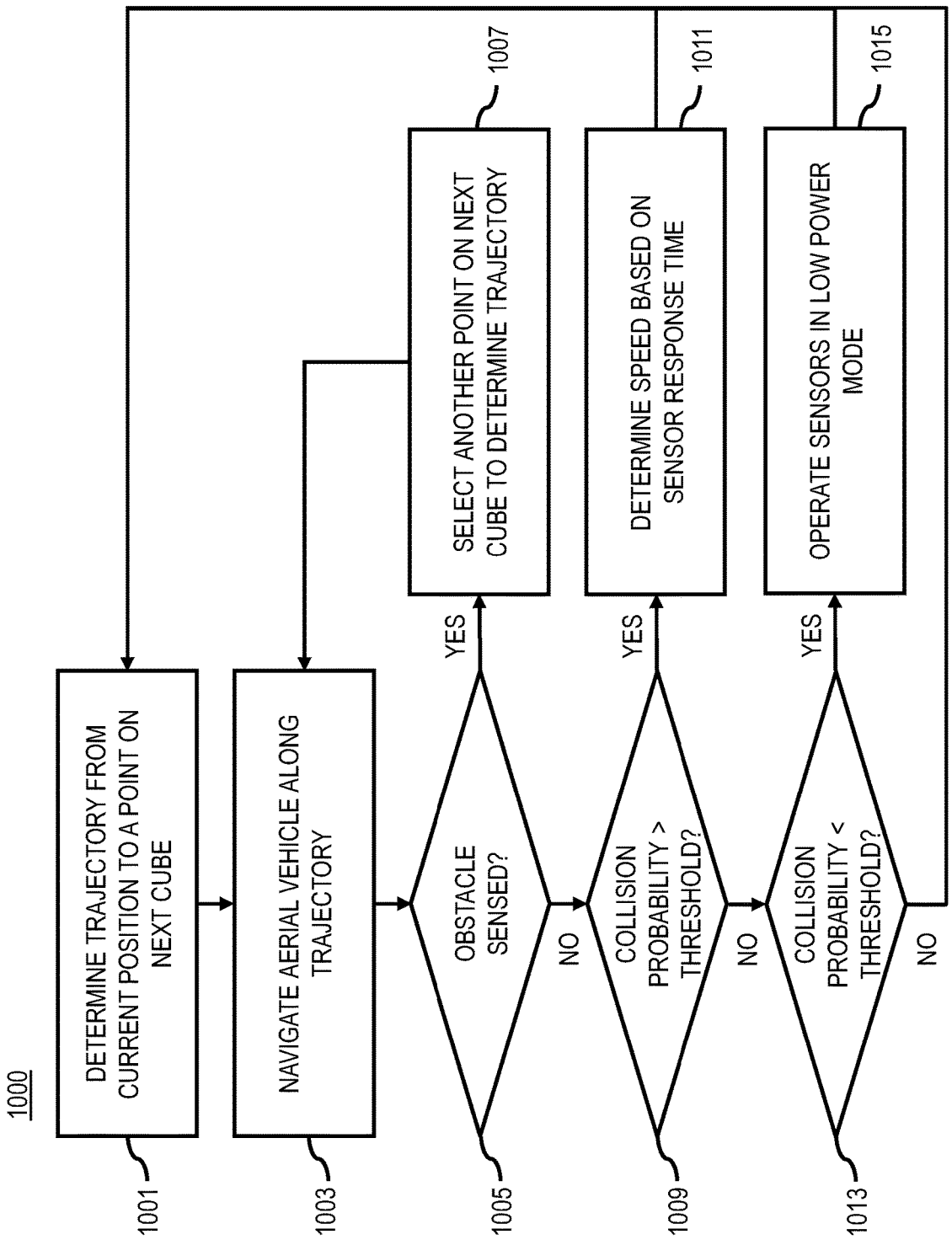
FIG. 10 is a flowchart of a process for using an aerial route calculated based on a collision probability space, according to one embodiment.

FIG. 10 is a flowchart of a process for using an aerial route calculated based on a collision probability space, according to one embodiment. In various embodiments, the routing client 111 and/or any of the modules 201-207 of the routing client 111 may perform one or more portions of the process 1000 and may be implemented in, for instance, a chip set including a processor and a memory as shown in FIG. 16. As such, the routing client 111 and/or the modules 201-207 can provide means for accomplishing various parts of the process 1000, as well as means for accomplishing embodiments of other processes described herein in conjunction with other components of the system 100. Although the process 1000 is illustrated and described as a sequence of steps, its contemplated that various embodiments of the process 1000 may be performed in any order or combination and need not include all of the illustrated steps.

Figure 11:
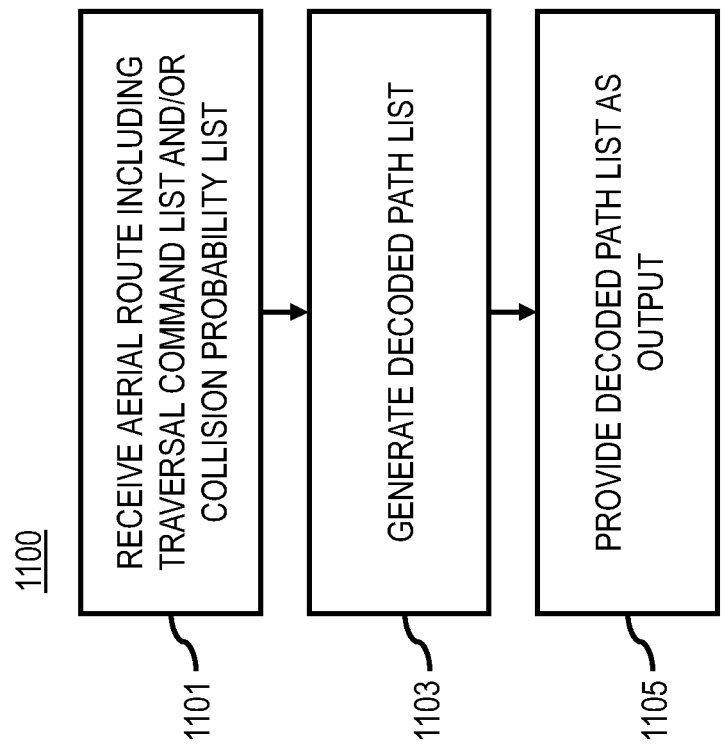
FIG. 11 is a flowchart of a process for decoding an aerial route calculated using a collision probability space, according to one embodiment.

The process 1000 can be performed after the routing client 111 of an aerial vehicle 101 has received an aerial route according to the embodiments described herein (e.g., according to embodiments of the process 900 of FIG. 9). In one embodiment, the aerial route may be encoded by the routing platform according to the embodiments of the process 700 of FIG. 7 above based on generating a traversal command list and/or a collision probability list using a hierarchical partitioning of 3D space encompassing the aerial route. FIG. 11 is a flowchart of a process for decoding an aerial route calculated using a collision probability space, according to one embodiment. In various embodiments, the routing client 111 and/or any of the modules 201-207 of the routing client 111 may also perform one or more portions of the process 1100.

As described above, the embodiments of the process 700 of FIG. 7 for encoding an aerial route takes advantage of the hierarchical nature of the partitioning of the 3D space to encode a route as a tree traversal with instructions on where to go at each node of the tree. The instructions include but are not limited to:

MATCH: flag the current cube or 3D shape as part of the route;
REFINE: drill into one level deeper of the current cube or 3D shape; and
EMPTY: skip the current cube or 3D shape, as it is not part of the path.

In step 1101, the routing module 203 of the routing client 111 receives an aerial route through 3D space. The 3D space is partitioned into a hierarchy of 3D shapes (e.g., cubes), and the aerial route includes a traversal command list of 3D shape IDs corresponding to one or more of the 3D shapes in the hierarchy associated with the aerial route and a respective traversal instruction for each of the 3D shape IDs in the traversal command list. In addition, the aerial list can also include a collision probability list indicating collision probability data for the cubes or 3D shapes in the aerial route. In other words, on receiving the encoded aerial route based on this scheme, the routing module 203 will have a list of traversal commands or instructions T and a list of cube/shape collision probabilities C.

In step 1103, the routing module 203 generates a decoded path list P by selectively adding said each of the 3D shape IDs in the traversal command list T to the path list based on the respective traversal instruction. The routing module 203 can begin by initializing an empty decoded path list P<-{ }. Then, in one embodiment, starting at a resolution level 0 or other designated resolution (e.g., at the root cube or 3D shape), the routing module 203 performs a depth-first walk of the partition hierarchy by following the instructions in the traversal command list T. In one embodiment, the depth-first walk can be performed using a decoding function (DECODE) with the CUBE-ID of the root cube or 3D shape according to the following example pseudo-functions:

```
HEAD(L): Returns the first element of a list L
TAIL(L): Returns a sublist of a list L, from its second element to its
last element.
DECODE(CUBE-ID, T, P)
 If HEAD(T) = EMPTY
    Return TAIL(T), P
 Else If HEAD(T) = MATCH
    Return TAIL(T), P + {CUBE-ID}
 Else if HEAD(T) = REFINE
    T_current <-TAIL(T)
    P_current <- P
    Loop over all eight child IDs CHILD-ID of CUBE-ID
                Recursively call T_current, P_current <-
                DECODE(CHILD-ID ,
                T_current, P_current)
    Return     T_current, P_current
```

When the DECODE function terminates, the decoded path is contained in the decoded path list P. In one embodiment, the routing module 203 can also match the 3D shape IDs (elements) in the decoded path list P to collision probability data of the collision probability list C. For example, the probability of collision for the ith element in the decoded path list P is the ith element in the collision probability list C.

In one embodiment, the routing module 203 can also determine a traversal order for the decoded path list by appending the 3D shapes in the decoded path list P based on identifying common faces between the 3D shapes. In other words, the correct order of traversal for the cubes or 3D shapes in P can be derived. Given that the path is constructed of adjacent cubes or 3D shapes from the route start to finish, the order of traversal can be reconstructed by appending cubes or shapes where adjoining cubes or shapes share common faces. In addition or alternatively, the routing module 203 can sort or order the cubes or 3D shapes in the decoded path list based on their distance from the starting location or to the destination (e.g., from closest to furthest from destination) and/or any other equivalent sorting process. In step 1105, the output modul2 207 can then provide decoded and ordered path list P as an output for an aerial vehicle to plan a route through the decoded path, e.g., taking into account collision probability for each cube or 3D shape in the aerial route as given by the collision probability C to control flight parameters (e.g., modulate flying speed) or perform related functions (e.g., activate or deactivate onboard sensors used for obstacle detection) as discussed in more detail below.

Returning to the process 1000 of FIG. 10, in one embodiment, to follow the cube path (e.g., the ordered list of 3D shapes representing the route) defined by the routing platform 107, the routing client 111 can further decode a series of trajectories from the received or decoded route to navigate the aerial vehicle 101. For example, the routing module 203 can navigate or initiate a movement of the aerial vehicle 101 from its current position using a cube-by-cube or shape-by-shape approach.

Accordingly, in step 1001, the routing module 203 determines or computes a trajectory from the current position of the aerial vehicle 101 to a point on the next cube or 3D shape in the route. In one embodiment, the point on the face of the next cube or 3D shape can be the closest point on the face of the next cube. However, it is contemplated that routing module 203 can use any process or mechanism (e.g., point in the center of the adjoining face of the next cube) for selecting the point on the next cube or 3D shape, and the point need not be the closest point. In one embodiment, the trajectory is a straight line between the current point and the point on the next cube or 3D shape.

Figure 12:
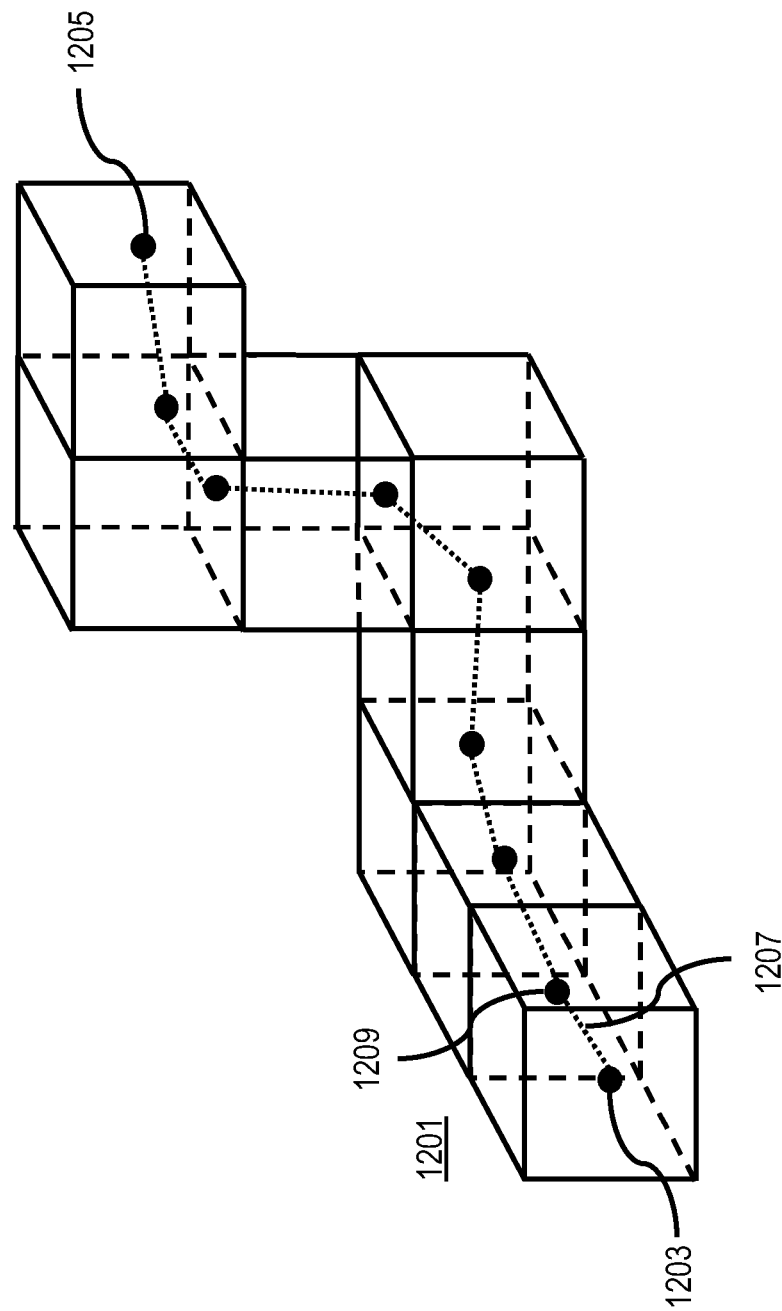
FIG. 12 is a diagram illustrating an example of constructing trajectories of an aerial route, according to one embodiment.

FIG. 12 is a diagram illustrating an example of constructing trajectories of an aerial route, according to one embodiment. In this example, a route 1201 from a start location 1203 to a target location 1205 is received by the routing client 111 from the routing platform 107 as a sequence of cubes. The current position of the aerial vehicle 101 is at the start location 1203, and the routing module 203 computes a trajectory 1207 from the start location 1203 to a point 1209 on the face of the next cube in the route 1201. Respective trajectories traversing each subsequent cube until the target location 1205 is reached can then be calculated.

Figure 13:
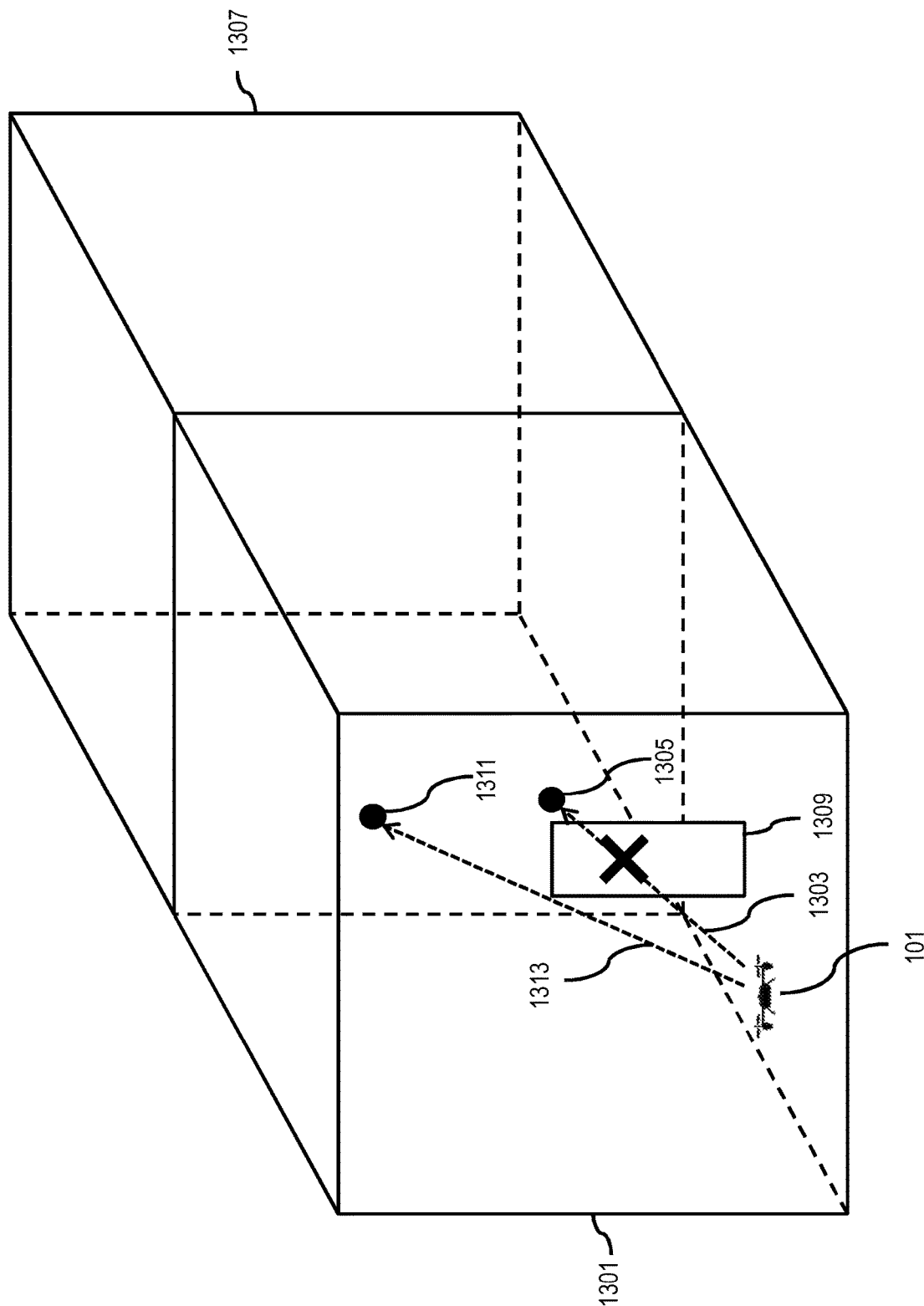
FIG. 13 is a diagram illustrating an example of re-calculating a trajectory in a 3D volume based on a sensed obstacle, according to one embodiment.

In step 1003, the routing module 203 initiates a movement of the aerial vehicle 101 along the computed trajectory. As the aerial vehicle 101 moves along the trajectory, one or more onboard sensors of the aerial vehicle 101 can be activated to detect any potential obstacles blocking the path along the trajectory. In step 1005, the routing module 203 determines whether any obstacles are sensed. In step 1007, if obstacles in the trajectory are detected by onboard sensors, the path is adjusted by moving around the obstacle and selecting a new destination on the next cube face. FIG. 13 illustrates an example of an aerial vehicle 101 that is traversing cube 1301 by flowing an initial trajectory 1303 computed from the aerial vehicle 101's current location to a closest point 1305 on the face of the next cube 1307. However, onboard sensors of the aerial vehicle 101 detect the presence of an obstacle 1309 in way of the initial trajectory 1303. In response, the routing client 111 of the aerial vehicle 101 selects another point 1311 on face of the next cube 1307 to determine another trajectory 1313 to navigate around the obstacle 1309.

In one embodiment, the routing client 111 can use the probability of survival given for each leg or cube of its route by modulating its speed. For example, in step 1009, the routing module determines whether the collision probability is greater than a threshold (or with the probability of survival is less than a threshold) for a given cube or leg of the route. In step 1011, based on determining that the collision probability is greater than the threshold, the routing module 203 can navigate along the higher risk leg by lowering the speed of the aerial vehicle 101 to allow for a higher response time from onboard sensors of the aerial vehicle 101. In other words, the routing module 203 can navigate the aerial vehicle 101 along the trajectory through the higher risk area at a speed determined based on a response time of an onboard sensor of the aerial vehicle 101 that is used for obstacle detection.

In one embodiment, the routing module 203 can also determine whether the collision probability of a cube or 3D shape is below a threshold value (e.g., indicating that there is relatively low risk in traversing the cube) (step 1013). For example, the threshold can be set so that probabilities below the threshold indicate that the cube is risk-free (e.g., open-air spaces). In step 1015, based on determining that the collision probability is below the threshold, the routing module 203 can operate one or more onboard sensors of the aerial vehicle 101 in a low-power mode to save on battery life. In addition or alternatively, the routing module 203 can increase the navigation speed of the aerial vehicle 101 through the cube.

In one embodiment, once the aerial vehicle 101 reaches the target cube or 3D shape in which the target location is located, the routing module 203 can configure the aerial vehicle 101 to onboard sensors while navigating in the target cube or 3D shape to accurately navigate to the X, Y, Z coordinates of the target location with the target cube.

Returning to FIG. 1, as shown, the system 100 comprises an aerial vehicle 101 equipped with a variety of sensors that can be used for navigation, obstacle detection, and/or other flight functions. In one embodiment, the aerial vehicle 101 can fly or otherwise operate autonomously or under direct control via the UE 113 that may include or be associated with one or more software applications 115 supporting routing based on collision probability according to the embodiments described herein. As previously discussed, the system 100 further includes routing platform 107 coupled to the geographic database 109, wherein the routing platform 107 performs the functions associated with providing aerial routes based on a collision probability space according to the various embodiments described herein. In one embodiment, the aerial vehicle 101, routing platform 107, UE 113, and other components of the system 100 have connectivity to each other via the communication network 121.

In one embodiment, the aerial vehicle 101 is capable of operating autonomously or via a remote pilot using UE 113 to fly the aerial vehicle 101 or configure a flight path or route for the aerial vehicle 101. In one embodiment, the aerial vehicle 101 is configured to travel using one or more modes of operation through a 3D space represented as cubes or other 3D shapes. The aerial vehicle 101 may include any number of sensors including cameras, recording devices, communication devices, etc. By way example, the sensors may include, but are not limited to, a global positioning system (GPS) sensor for gathering location data based on signals from a positioning satellite, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. The aerial vehicle 101 may also include recording devices for recording, storing, and/or streaming sensor and/or other telemetry data to the UE 113 and/or the routing platform 107 for mapping or routing.

In one embodiment, the aerial vehicle 101 is capable of being configured with and executing at least one route based on a collision probability space according to the embodiments described herein. The aerial vehicle 101 can also be configured avoid areas with high risk levels, populated areas, objects, and/or obstructions. In addition, the aerial vehicle 101 can be configured to observe restricted paths or routes. For example, the restricted paths may be based on governmental regulations that govern/restrict the path that the aerial vehicle 101 may fly (e.g., Federal Aviation Administration (FAA) policies regarding required distances between objects). In one embodiment, the system 100 may also take into account one or more pertinent environmental or weather conditions (e.g., rain, water levels, sheer winds, etc. in and around underground passageways and their entry/exit points) in determining a route or flight path.

In one embodiment, the aerial vehicle 101 may determine contextual information such as wind and weather conditions in route that may affect the aerial vehicle 101's ability to follow the specified route and then relay this information in substantially real-time to the system 100. In one embodiment, the aerial vehicle 101 may request one or more modifications of the flight path based, at least in part, on the determination of the contextual information or a change in the real-time calculated risk levels over areas of interest (e.g., newly detected or updated risk factors causing a sudden and unexpected change in risk levels). In one embodiment, the system 100 creates a data object to represent the aerial route and may automatically modify the route data object based on receipt of the contextual information from the aerial vehicle 101 or another source and then transmit the new route object to the aerial vehicle 101 for execution. In one embodiment, the aerial vehicle 101 can determine or access the new route data object and/or determine or access just the relevant portions and adjust its current path accordingly. For example, if multiple highly dense population areas (e.g., buildings) are encountered, the system 100 may condense the width of the aerial vehicle 101's flight path to better ensure that the aerial vehicle 101 will avoid the closely situation population-dense areas.

By way of example, a UE 113 is any type of dedicated aerial vehicle control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 113 can support any type of interface to the user (such as "wearable" circuitry, etc.). In one embodiment, a UE 113 may support any type of interface for piloting or routing the aerial vehicle 101. In addition, a UE 113 may facilitate various input means for receiving and generating information, including, but not restricted to, a touch screen capability, a keyboard and keypad data entry, a voice-based input mechanism, and the like. Any known and future implementations of a UE 113 may also be applicable.

By way of example, the UE 113 and/or the aerial vehicle 101 may execute applications 115, which may include various applications such as an aerial routing application, a location-based service application, a navigation application, a content provisioning application, a camera/imaging application, a media player application, an e-commerce application, a social networking application, and/or the like. In one embodiment, the applications 115 may include one or more feature applications used for providing aerial routes based on a collision probability space according to the embodiments described herein. In one embodiment, the application 115 may act as a client for the routing platform 107 and perform one or more functions of the routing platform 107 alone or in combination with the routing platform 107. In one embodiment, an application 115 may be considered as a Graphical User Interface (GUI) that can enable a user to configure a route or flight path for execution by aerial vehicle 101 according to the embodiments described herein.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the routing platform 107 can interact with the services platform 117 to receive data for providing routing or operation of the aerial vehicle 101 based on dynamic collision probability determination. By way of example, the services platform 117 may include one or more services 119 or interact with one or more content providers 123a-123m for providing content services, provisioning services, application services, storage services, mapping services, navigation services, contextual information determination services, location-based services, information-based services (e.g., weather), etc. In one embodiment, the services platform 117 may interact with the aerial vehicle 101, UE 113, and/or routing platform 107 to supplement or aid in providing aerial routing based on a collision probability space.

By way of example, the aerial vehicle 101, UE 113, routing platform 107, and the services platform 117 communicate with each other and other components of the system 100 using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 14:
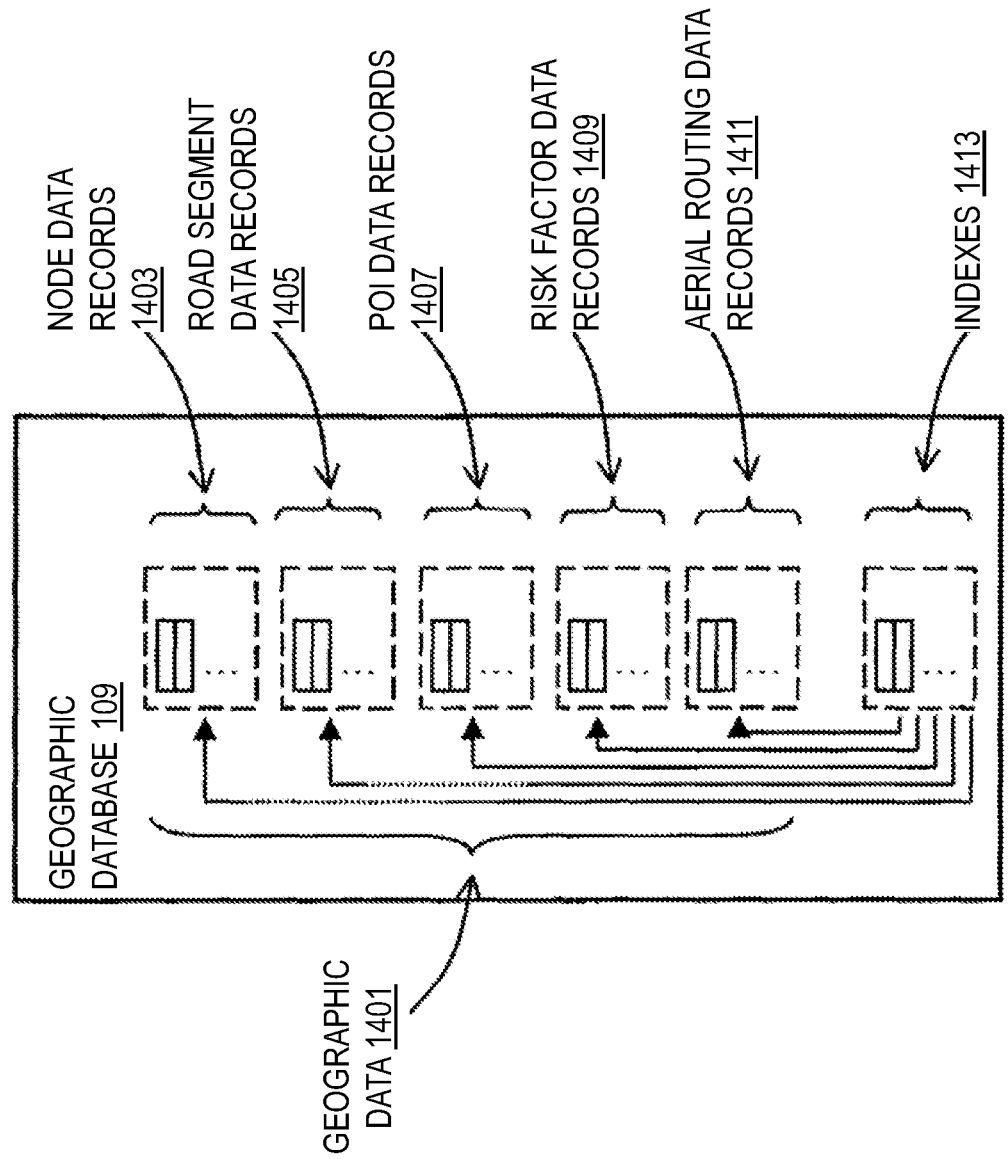
FIG. 14 is a diagram of a geographic database capable of storing map data for underground/interior drone routing, according to one embodiment.

FIG. 14 is a diagram of a geographic database 109, according to one embodiment. In one embodiment, the geographic database 109 includes geographic data 1401 used for (or configured to be compiled to be used for) mapping and/or navigation-related services, such as for routing aerial vehicles based on population density data to create a 3D flightpath or route.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 1401 of the database 109 includes node data records 1403, road segment or link data records 1405, POI data records 1407, risk factor data records 1409, aerial routing data records 1411, and indexes 1413, for example. More, fewer or different data records can be provided. In one embodiment, additional data records (not shown) can include cartographic ("carto") data records, routing data, and maneuver data. In one embodiment, the indexes 1413 may improve the speed of data retrieval operations in the geographic database 109. In one embodiment, the indexes 1413 may be used to quickly locate data without having to search every row in the geographic database 109 every time it is accessed. For example, in one embodiment, the indexes 1413 can be a spatial index of the polygon points associated with stored feature polygons.

In exemplary embodiments, the road segment data records 1405 are links or segments representing roads, streets, or paths, as can be used in the calculated route or recorded route information for determination of one or more personalized routes. The node data records 1403 are end points corresponding to the respective links or segments of the road segment data records 1405. The road link data records 1405 and the node data records 1403 represent a road network, such as used by vehicles, cars, and/or other entities. In addition, the geographic database 109 can contain path segment and node data records or other data that represent 3D paths around 3D map features (e.g., terrain features, buildings, other structures, etc.) that occur above street level, such as when routing or representing flightpaths of aerial vehicles (e.g., drones 101), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1407. The geographic database 109 can also include data about places, such as cities, towns, or other communities, and other geographic features, such as bodies of water, mountain ranges, etc. Such place or feature data can be part of the POI data records 1407 or can be associated with POIs or POI data records 1407 (such as a data point used for displaying or representing a position of a city).

In one embodiment, the geographic database 109 can also include risk factor data records 1409 for the digital map data representing risk factors or risk-related data, calculated risk levels (e.g., collision probability, probability of survival due to shape-related factors, probability of survival due to aerial-vehicle related factors, etc.), risk level visualizations, dynamic population density predictions generated for areas or interest, and related data. In one embodiment, the risk factor data records 1409 can be associated with one or more of the node records 1403, road segment records 1405, and/or POI data records 1407 so that the predicted population densities can inherit characteristics, properties, metadata, etc. of the associated records (e.g., location, address, POI type, etc.). In one embodiment, the system 100 (e.g., via the routing platform 107 can use the dynamic population density predictions to generate aerial vehicles routes.

In one embodiment, the system 100 is capable of generating aerial routes using the digital map data and/or real-time data stored in the geographic database 109 based on risk level visualization and/or predictions. The resulting aerial routing and guidance can be stored in the aerial routing data records 1411. By way of example, the routes stored in the data records 1411 can be created for individual 3D flight-paths or routes as they are requested by drones or their operators. In this way, previously generated aerial routes can be reused for future drone travel to the same target location.

In one embodiment, the aerial routes stored in the aerial routing data records 1411 can be specific to characteristics of the aerial vehicle 101 (e.g., drone type, size, supported modes of operation) and/or other population density characteristics of the route. In addition, the aerial routes generated according to the embodiments described herein can be based on contextual parameters (e.g., time-of-day, day-of-week, season, etc.).

In one embodiment, the geographic database 109 can be maintained by the services platform 117 and/or any of the services 119 of the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles (e.g., mapping drones or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the aerial vehicle 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing aerial route calculation in a 3D space may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 15:
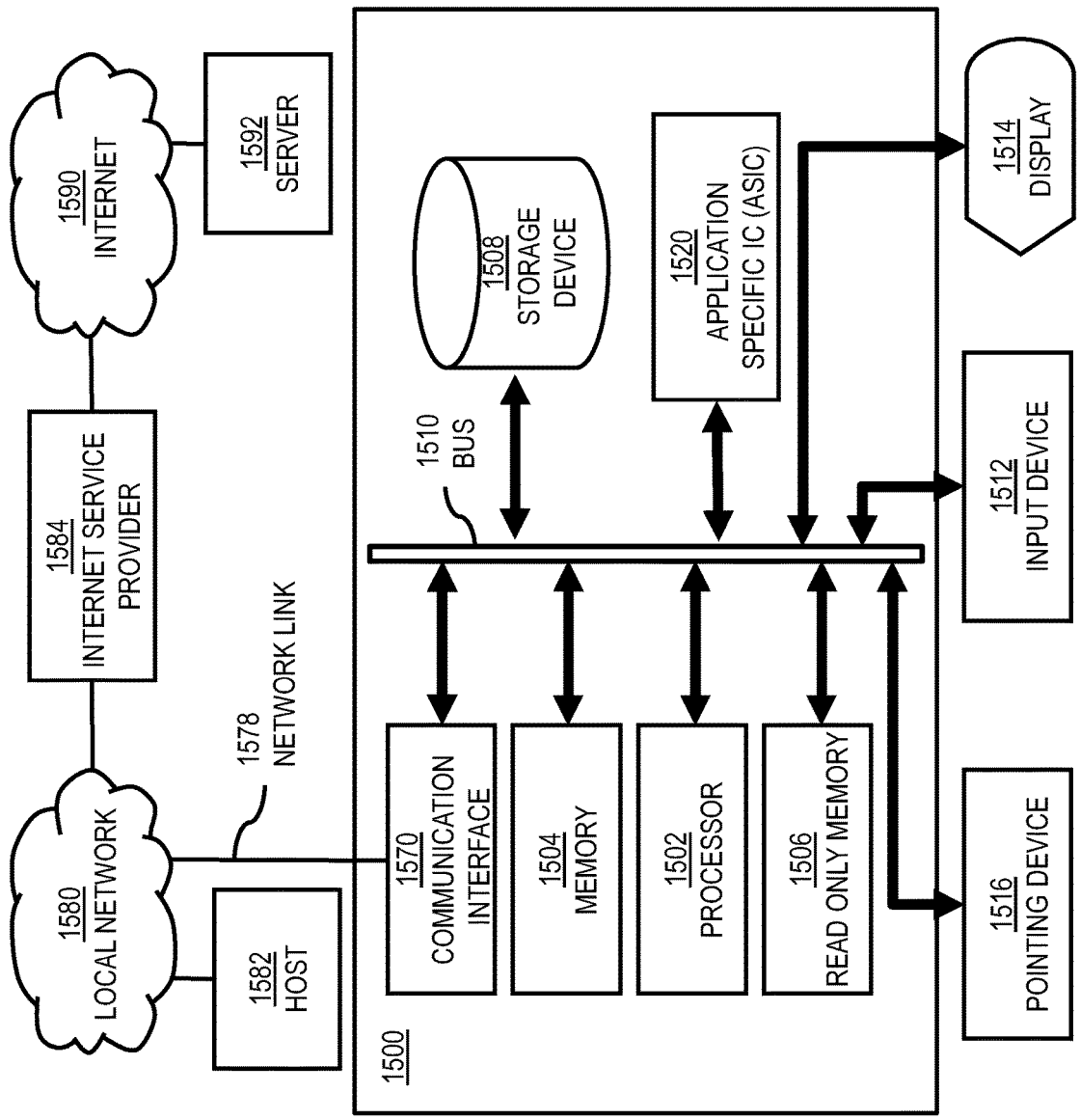
FIG. 15 is a diagram of hardware that can be used to implement an embodiment.

FIG. 15 illustrates a computer system 1500 upon which an embodiment of the invention may be implemented. Computer system 1500 is programmed (e.g., via computer program code or instructions) to provide aerial route calculation in a 3D space as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1510 includes one or more parallel conductors of information so that information is transferred quickly among devices coupled to the bus 1510. One or more processors 1502 for processing information are coupled with the bus 1510.

A processor 1502 performs a set of operations on information as specified by computer program code related to providing aerial route calculation in a 3D space. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1500 also includes a memory 1504 coupled to bus 1510. The memory 1504, such as a random access memory (RAM) or other dynamic storage device, stores information including processor instructions for providing aerial route calculation in a 3D space. Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for providing aerial route calculation in a 3D space, is provided to the bus 1510 for use by the processor from an external input device 1512, such as a keyboard containing alphanumeric keys operated by a human user, or a sensor. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT) or a liquid crystal display (LCD), or plasma screen or printer for presenting text or images, and a pointing device 1516, such as a mouse or a trackball or cursor direction keys, or motion sensor, for controlling a position of a small cursor image presented on the display 1514 and issuing commands associated with graphical elements presented on the display 1514. In some embodiments, for example, in embodiments in which the computer system 1500 performs all functions automatically without human input, one or more of external input device 1512, display device 1514 and pointing device 1516 is omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of application specific ICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a one-way or two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. For wireless links, the communications interface 1570 sends or receives or both sends and receives electrical, acoustic or electromagnetic signals, including infrared and optical signals, that carry information streams, such as digital data. For example, in wireless handheld devices, such as mobile telephones like cell phones, the communications interface 1570 includes a radio band electromagnetic transmitter and receiver called a radio transceiver. In certain embodiments, the communications interface 1570 enables connection to the communication network 121 for providing aerial route calculation in a 3D space.

The term computer-readable medium is used herein to refer to any medium that participates in providing information to processor 1502, including instructions for execution. Such a medium may take many forms, including, but not limited to, non-volatile media, volatile media and transmission media. Non-volatile media include, for example, optical or magnetic disks, such as storage device 1508. Volatile media include, for example, dynamic memory 1504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 16 illustrates a chip set 1600 upon which an embodiment of the invention may be implemented. Chip set 1600 is programmed to provide aerial route calculation in a 3D space as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform the inventive steps described herein to provide aerial route calculation in a 3D space. The memory 1605 also stores the data associated with or generated by the execution of the inventive steps.

Figure 17:
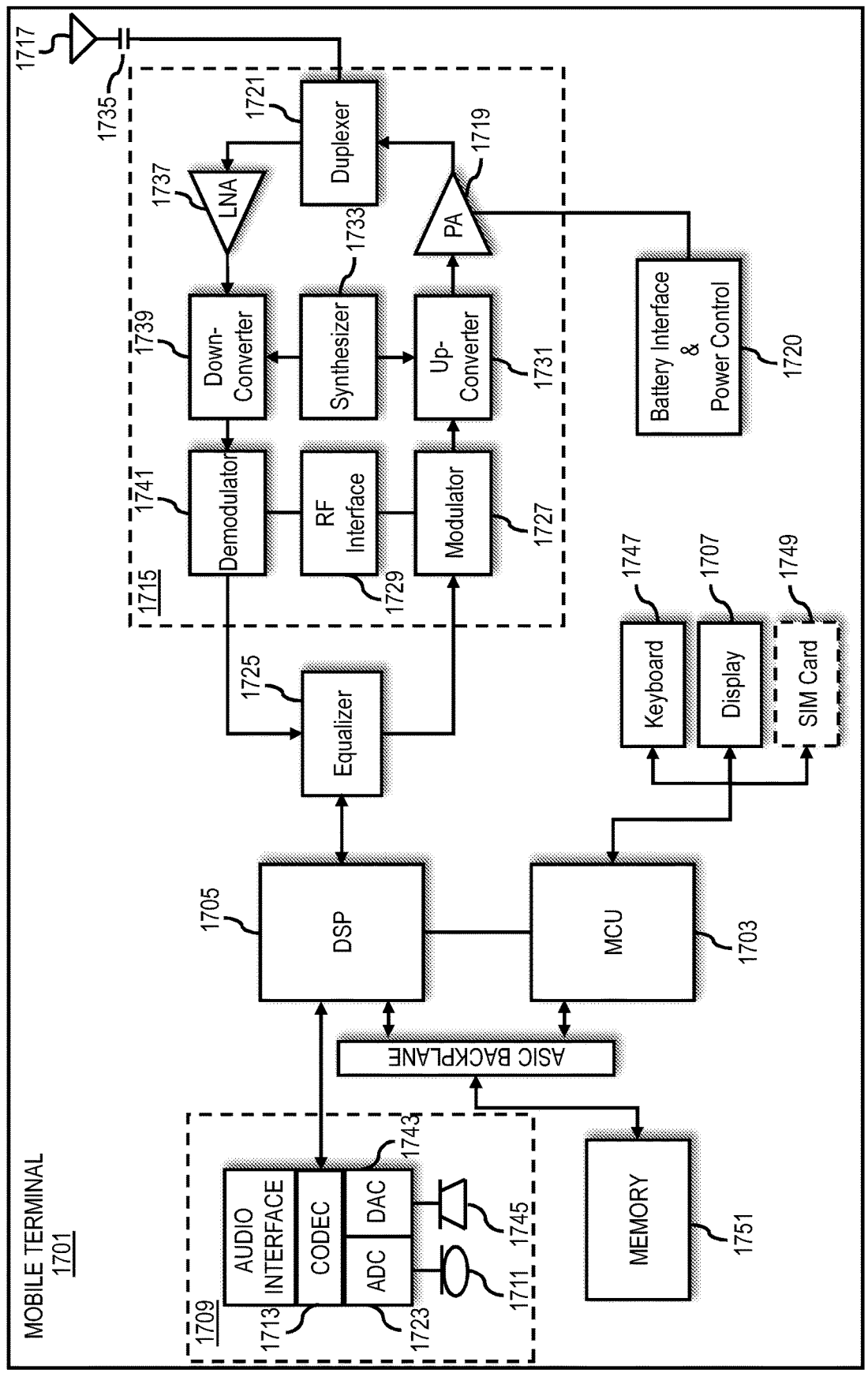
FIG. 17 is a diagram of a mobile terminal (e.g., handset or aerial vehicle or part thereof) that can be used to implement an embodiment.

FIG. 17 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1703, a Digital Signal Processor (DSP) 1705, and a receiver/transmitter unit including a microphone gain control unit and a speaker gain control unit. A main display unit 1707 provides a display to the user in support of various applications and mobile station functions that offer automatic contact matching. An audio function circuitry 1709 includes a microphone 1711 and microphone amplifier that amplifies the speech signal output from the microphone 1711. The amplified speech signal output from the microphone 1711 is fed to a coder/decoder (CODEC) 1713.

A radio section 1715 amplifies power and converts frequency in order to communicate with a base station, which is included in a mobile communication system, via antenna 1717. The power amplifier (PA) 1719 and the transmitter/modulation circuitry are operationally responsive to the MCU 1703, with an output from the PA 1719 coupled to the duplexer 1721 or circulator or antenna switch, as known in the art. The PA 1719 also couples to a battery interface and power control unit 1720.

In use, a user of mobile station 1701 speaks into the microphone 1711 and his or her voice along with any detected background noise is converted into an analog voltage. The analog voltage is then converted into a digital signal through the Analog to Digital Converter (ADC) 1723. The control unit 1703 routes the digital signal into the DSP 1705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1725 for compensation of any frequency-dependent impairments that occur during transmission though the air such as phase and amplitude distortion. After equalizing the bit stream, the modulator 1727 combines the signal with a RF signal generated in the RF interface 1729. The modulator 1727 generates a sine wave by way of frequency or phase modulation. In order to prepare the signal for transmission, an up-converter 1731 combines the sine wave output from the modulator 1727 with another sine wave generated by a synthesizer 1733 to achieve the desired frequency of transmission. The signal is then sent through a PA 1719 to increase the signal to an appropriate power level. In practical systems, the PA 1719 acts as a variable gain amplifier whose gain is controlled by the DSP 1705 from information received from a network base station. The signal is then filtered within the duplexer 1721 and optionally sent to an antenna coupler 1735 to match impedances to provide maximum power transfer. Finally, the signal is transmitted via antenna 1717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1701 are received via antenna 1717 and immediately amplified by a low noise amplifier (LNA) 1737. A down-converter 1739 lowers the carrier frequency while the demodulator 1741 strips away the RF leaving only a digital bit stream. The signal then goes through the equalizer 1725 and is processed by the DSP 1705. A Digital to Analog Converter (DAC) 1743 converts the signal and the resulting output is transmitted to the user through the speaker 1745, all under control of a Main Control Unit (MCU) 1703—which can be implemented as a Central Processing Unit (CPU) (not shown).

The MCU 1703 receives various signals including input signals from the keyboard 1747. The keyboard 1747 and/or the MCU 1703 in combination with other user input components (e.g., the microphone 1711) comprise a user interface circuitry for managing user input. The MCU 1703 runs a user interface software to facilitate user control of at least some functions of the mobile station 1701 to provide aerial route calculation in a 3D space. The MCU 1703 also delivers a display command and a switch command to the display 1707 and to the speech output switching controller, respectively. Further, the MCU 1703 exchanges information with the DSP 1705 and can access an optionally incorporated SIM card 1749 and a memory 1751. In addition, the MCU 1703 executes various control functions required of the station. The DSP 1705 may, depending upon the implementation, perform any of a variety of conventional digital processing functions on the voice signals. Additionally, DSP 1705 determines the background noise level of the local environment from the signals detected by microphone 1711 and sets the gain of microphone 1711 to a level selected to compensate for the natural tendency of the user of the mobile station 1701.

The CODEC 1713 includes the ADC 1723 and DAC 1743. The memory 1751 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1751 may be, but not limited to, a single memory, CD, DVD, ROM, RAM, EEPROM, optical storage, or any other non-volatile or non-transitory storage medium capable of storing digital data.

An optionally incorporated SIM card 1749 carries, for instance, important information, such as the cellular phone number, the carrier supplying service, subscription details, and security information. The SIM card 1749 serves primarily to identify the mobile station 1701 on a radio network. The card 1749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining a root three-dimensional (3D) shape encompassing an aerial route through a 3D space, wherein the 3D space is partitioned into a hierarchy of 3D shapes according to a tree structure including the root 3D shape and one or more child shapes, and wherein the aerial route comprises a list of 3D shape identifiers (IDs) corresponding to the 3D shapes in the hierarchy that form the aerial route;
    recursively performing a comparison of a respective 3D shape ID of the root 3D shape or the one or more child shapes of the root 3D shape to the list of 3D shape IDs of the aerial route;
    generating a traversal command list by selectively adding each of the respective 3D shape ID to the traversal command list that matches at least one 3D shape ID of the aerial route or includes the least one shape ID of the aerial route as a child 3D shape ID; and
    providing the traversal command list as an output representing the aerial route.

2. The method of claim 1, further comprising:
    adding an instruction in the traversal command list to flag the respective 3D shape ID as part of the aerial route based on the comparison indicating the respective 3D shape ID matches the at least one shape ID of the aerial route.

3. The method of claim 1, further comprising:
    adding an instruction in the traversal command list to drill into one level deeper of the root 3D shape or a currently compared 3D shape based on the comparison indicating that the respective 3D shape ID includes the least one 3D shape ID of the aerial route as the child 3D shape ID.

4. The method of claim 1, further comprising:
    adding an instruction in the traversal command list to indicate that the respective 3D shape ID is empty based on the comparison indicating that the respective 3D shape ID does not match the at least one 3D shape ID of the aerial or does not include the at least one 3D shape ID of the aerial route as the child 3D shape ID.

5. The method of claim 1, further comprising:
    generating a collision probability list by adding said each of the respective 3D shape IDs that matches the least one 3D shape ID of the aerial route and a corresponding collision probability to the collision probability list.

6. The method of claim 1, wherein the corresponding collision probability is included in and determined from the aerial route.

7. The method of claim 1, wherein the output includes a binary encoding of the traversal command list.

8. The method of claim 7, wherein the binary encoding uses a binary representation of one or more traversal instructions included in the traversal command list.

9. The method of claim 1, wherein the 3D shapes in the hierarchy are cube shapes, and the 3D shape IDs are cube IDs.

10. A method comprising:
    determining a root three-dimensional (3D) shape encompassing an aerial route through a 3D space, wherein the 3D space is partitioned into a hierarchy of 3D shapes, and wherein the aerial route comprises a list of 3D shape identifiers (IDs) corresponding to one or more of the 3D shapes in the hierarchy that form the aerial route;
    recursively performing a comparison of a respective 3D shape ID of the root 3D shape or one or more child shapes of the root 3D shape to the list of 3D shape IDs of the aerial route;
    generating a traversal command list by selectively adding each of the respective 3D shape ID to the traversal command list that matches at least one 3D shape ID of the aerial route or includes the least one shape ID of the aerial route as a child 3D shape ID;
    providing the traversal command list as an output representing the aerial route, wherein the binary encoding uses a binary representation of one or more traversal instructions included in the traversal command list
    , wherein the one or more traversal instructions include a first instruction indicating no match between the respective 3D shape ID and the at least one 3D shape ID of the aerial route, a second instruction indicating that the 3D shape ID includes the at least one 3D shape ID of the aerial route as the child 3D shape ID, and a third instruction indicating that the respective 3D shape ID and the at least one 3D shape ID of the aerial route match.

11. An apparatus comprising:
    at least one processor; and
    at least one memory including computer program code for one or more programs,
    the at least one memory and the computer program code configured to, with the at least one processor, cause the apparatus to:
        receive an aerial route through a three-dimensional (3D) space, wherein the 3D space is partitioned into a hierarchy of 3D shapes according to a tree structure including the root 3D shape and one or more child shapes, and wherein the aerial route includes a traversal command list of 3D shape identifiers (IDs) corresponding to the 3D shapes in the hierarchy associated with the aerial route and a respective traversal instruction for each of the 3D shape IDs in the traversal command list;

generate a decoded path list by selectively adding said each of the 3D shape IDs in the traversal command list to the path list based on the respective traversal instruction; and providing the decoded path list as an output.

12. The apparatus of claim 11, wherein the aerial route further includes a collision probability list, and wherein the apparatus is further caused to:

match the 3D shape IDs in the decoded path list to collision probability data of the collision probability list.

13. The apparatus of claim 11, wherein the apparatus is further caused to:

determining a traversal order for the decoded path list by appending the 3D shapes in the decoded path list based on identifying common faces between the 3D shapes.

14. The apparatus of claim 12, wherein the apparatus is further caused to:

sort the 3D shapes based on a distance to a destination of the aerial route.

15. The apparatus of claim 11, wherein the output is used to navigate an aerial vehicle along the aerial route.

16. A non-transitory computer-readable storage medium carrying one or more sequences of one or more instructions which, when executed by one or more processors, cause an apparatus to perform:

determining a root three-dimensional (3D) shape encompassing an aerial route through a 3D space, wherein the 3D space is partitioned into a hierarchy of 3D shapes according to a tree structure including the root 3D shape and one or more child shapes, and wherein the aerial route comprises a list of 3D shape identifiers (IDs) corresponding to the 3D shapes in the hierarchy that form the aerial route;

recursively performing a comparison of a respective 3D shape ID of the root 3D shape or the one or more child shapes of the root 3D shape to the list of 3D shape IDs of the aerial route;

generating a traversal command list by selectively adding each of the respective 3D shape ID to the traversal command list that matches at least one 3D shape ID of the aerial route or includes the least one shape ID of the aerial route as a child 3D shape ID; and providing the traversal command list as an output representing the aerial route.

17. The non-transitory computer-readable storage medium of claim 16, wherein the apparatus is caused to further perform:

adding an instruction in the traversal command list to flag the respective 3D shape ID as part of the aerial route based on the comparison indicating the respective 3D shape ID matches the at least one shape ID of the aerial route.

18. The non-transitory computer-readable storage medium of claim 16, wherein the apparatus is caused to further perform:

adding an instruction in the traversal command list to drill into one level deeper of the root 3D shape or a currently compared 3D shape based on the comparison indicating that the respective 3D shape ID includes the least one 3D shape ID of the aerial route as the child 3D shape ID.

19. The non-transitory computer-readable storage medium of claim 16, wherein the apparatus is caused to further perform:

adding an instruction in the traversal command list to indicate that the respective 3D shape ID is empty based on the comparison indicating that the respective 3D shape ID does not match the at least one 3D shape ID of the aerial route or does not include the at least one 3D shape ID of the aerial route as the child 3D shape ID.

20. The non-transitory computer-readable storage medium of claim 16, wherein the apparatus is caused to further perform:

generating a collision probability list by adding said each of the respective 3D shape IDs that matches the least one 3D shape ID of the aerial route and a corresponding collision probability to the collision probability list.

* * * * *